United States Patent
Yang et al.

(10) Patent No.: US 11,057,745 B2
(45) Date of Patent: Jul. 6, 2021

(54) DATA TRANSMISSION METHOD AND RELATED APPARATUS

(71) Applicant: Huawei Technologies Co., Ltd., Shenzhen (CN)

(72) Inventors: Yanmei Yang, Beijing (CN); Qiang Deng, Shenzhen (CN); Runze Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 16/142,714

(22) Filed: Sep. 26, 2018

(65) Prior Publication Data

US 2019/0028855 A1 Jan. 24, 2019

Related U.S. Application Data

(63) Continuation of application No. PCT/CN2016/078401, filed on Apr. 1, 2016.

(51) Int. Cl.
*H04W 4/06* (2009.01)
*H04W 76/40* (2018.01)
(Continued)

(52) U.S. Cl.
CPC ............. *H04W 4/06* (2013.01); *H04L 45/16* (2013.01); *H04L 61/2007* (2013.01);
(Continued)

(58) Field of Classification Search
CPC ........ H04W 4/06; H04W 76/40; H04L 45/16; H04L 61/2007
See application file for complete search history.

(56) References Cited

U.S. PATENT DOCUMENTS

2010/0061331 A1* 3/2010 Guo .................. H04W 76/38
 370/329
2011/0206002 A1 8/2011 Jeon et al.
(Continued)

FOREIGN PATENT DOCUMENTS

CN 101304550 A 11/2008
CN 101340355 A 1/2009
(Continued)

OTHER PUBLICATIONS

CATT: "Discussion on V2X architecture", 3GPP Draft; R3-160226, 3GPP, Mobile Competence centre; France, vol. RAN WG3, No. St, Julian's Malta; Feb. 2016 (Year: 2016).*
(Continued)

*Primary Examiner* — Siming Liu
(74) *Attorney, Agent, or Firm* — Slater Matsil, LLP

(57) ABSTRACT

A data transmission method and a related apparatus are disclosed. The method is performed by a local MBMS functional entity, and includes obtaining local MBMS bearer information by using an interface between the local MBMS functional entity and an MBMS functional entity in a core network, after receiving application layer data sent by a local application server, determining a local MBMS bearer information matching the application layer data, and sending the application layer data based on the local MBMS bearer information matching the application layer data.

20 Claims, 15 Drawing Sheets

(51) Int. Cl.
*H04W 28/02* (2009.01)
*H04L 12/761* (2013.01)
*H04L 29/12* (2006.01)
*H04W 92/20* (2009.01)

(52) U.S. Cl.
CPC ... *H04W 28/0252* (2013.01); *H04W 28/0268* (2013.01); *H04W 76/40* (2018.02); *H04W 92/20* (2013.01)

(56) References Cited

U.S. PATENT DOCUMENTS

2014/0376440 A1 12/2014 Oyman
2018/0146362 A1 5/2018 Hou et al.

FOREIGN PATENT DOCUMENTS

CN 105163285 A 12/2015
JP 2014525699 A 9/2014

OTHER PUBLICATIONS

"3rd Generation Partnership Project; Technical Specification Group Services and System Aspects; Group Communication System Enablers for LTE (GCSE_LTE); Stage 2 (Release 13)," 3GPP TS 23.468, V13.3.0, Dec. 2015, 30 pages.

"Discussion on V2X Architecture," Source: CATT, Agenda Item: 12.2, Document for: Discussion and Decision, 3GPP TSG RAN WG3 Meeting #91, St. Julian's, Malta, R3-160226, Feb. 15-19, 2016, 3 pages.

"MBMS Architectures for Local and Remote V2X Application Servers," Agenda Item: 12.2, Source: Mitsubishi Electric, Document for: Discussion and Decision, 3GPP TSG RAN WG3 Meeting #90, Anaheim, CA, R3-160315, Nov. 16-20, 2015, 3 pages.

* cited by examiner

DATA TRANSMISSION METHOD AND RELATED APPARATUS

CROSS-REFERENCE TO RELATED APPLICATIONS

This application is a continuation of International Application No. PCT/CN2016/078401, filed on Apr. 1, 2016, the disclosure of which is hereby incorporated by reference in its entirety.

TECHNICAL FIELD

The present application relates to the field of communications technologies, and in particular, to a data transmission method and a related apparatus.

BACKGROUND

With development of network applications, in addition to some conventional mobile Internet services, there are application scenarios and requirements for deploying more application servers in positions relatively close to a base station. For example, in a stadium application scenario, a local application server is deployed in a stadium. Some content delivery network (CDN) service providers also consider deploying a local CDN server to implement video acceleration. In addition, a future 5th generation mobile communications network is a network that interconnects everything. Both the Internet of Vehicles and the Internet of Things are important types of subnets in the 5th generation mobile communications network, and more local application servers are also deployed in the new subnets, for example, message broadcast in a cooperative driving application on the Internet of Vehicles. A multimedia broadcast/multicast service (MBMS), as a transmission technology, is mainly applicable to a scenario in which many users receive same content at a time. Because there are a lot of requirements for transmitting same content to a plurality of users simultaneously in scenarios of the Internet of Vehicles, the Internet of Things, and the like, using MBMS as one of transmission technologies for transmission in this type of local application is a possible technology direction.

However, in an existing enhanced MBMS (eMBMS) network architecture, key network elements such as a broadcast/multicast service center (BMSC) and a multimedia broadcast/multicast service gateway (MBMS GW) are usually deployed in a core network. Therefore, when the prior art is used to implement transmission of local application layer data, because both the BMSC and the MBMS GW are deployed in the core network, a forwarding plane for the local application layer data needs to be first sent by a local end to the core network and then sent by the core network to the local end, causing a long delay in transmission of the local application layer data and a waste of bandwidth of the core network.

SUMMARY

Embodiments of the present application provide a data transmission method and a related apparatus to resolve a prior-art technical problem that a forwarding plane for local application layer data needs to be first sent by a local end to a core network and then sent by the core network to the local end, causing a long delay in transmission of the local application layer data and a waste of bandwidth of the core network.

An embodiment of the present application provides a data transmission method, including obtaining, by a local MBMS functional entity, local MBMS bearer information, receiving, by the local MBMS functional entity, application layer data sent by a local application server, determining, by the local MBMS functional entity based on the obtained local MBMS bearer information, local MBMS bearer information matching the application layer data, and sending, by the local MBMS functional entity, the application layer data based on the matched local MBMS bearer information.

In this way, the local MBMS functional entity obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

Optionally, the determining, by the local MBMS functional entity, local MBMS bearer information matching the application layer data includes obtaining, by the local MBMS functional entity, a destination IP address of the application layer data, and if the local MBMS bearer information includes the destination IP address of the application layer data, using the local MBMS bearer information including the destination IP address of the application layer data, as the matched local MBMS bearer information.

In this way, the local MBMS functional entity determines, based on the obtained destination IP address of the application layer data, the local MBMS bearer information matching the application layer data. Because the destination IP address is information carried in a packet for sending the application layer data, information serving as a basis in a matching process can be obtained conveniently, and accuracy of matching can be ensured effectively.

Optionally, an MBMS functional entity in a core network includes a broadcast/multicast service center BMSC in the core network and a multimedia broadcast/multicast service gateway MBMS GW in the core network, and the obtaining, by a local MBMS functional entity, local MBMS bearer information includes receiving, by the local MBMS functional entity by using an Mx1 interface between the local MBMS functional entity and the MBMS GW in the core network, the local MBMS bearer information sent by the MBMS GW in the core network.

Optionally, an MBMS functional entity in a core network includes a BMSC in the core network and an MBMS GW in the core network, the local MBMS functional entity includes a local broadcast/multicast service center user plane (BMSC_U) and a local multimedia broadcast/multicast service gateway user plane (MBMS GW_U), and the local MBMS bearer information includes first MBMS bearer information and second MBMS bearer information, and the obtaining, by a local MBMS functional entity, local MBMS bearer information includes receiving, by the local BMSC_U, the first MBMS bearer information by using an Mz interface between the local BMSC_U and the BMSC in the core network, and receiving, by the local MBMS GW_U, the first MBMS bearer information and the second MBMS bearer information by using an Mx2 interface between the local MBMS GW_U and the MBMS GW in the core network.

Optionally, an MBMS functional entity in a core network includes a BMSC in the core network and an MBMS GW in the core network, and the local MBMS bearer information includes third MBMS bearer information and fourth MBMS bearer information, and the obtaining, by a local MBMS functional entity, local MBMS bearer information includes receiving, by the local MBMS functional entity, a bearer setup request message sent by the local application server, sending, by the local MBMS functional entity, a bearer identity request message to the BMSC in the core network, receiving, by the local MBMS functional entity by using an My interface between the local MBMS functional entity and the BMSC in the core network, the third MBMS bearer information sent by the BMSC in the core network, and determining, by the local MBMS functional entity, the fourth MBMS bearer information according to the bearer setup request message.

Optionally, the local MBMS bearer information includes a destination IP address corresponding to a local MBMS bearer, and after the obtaining, by a local MBMS functional entity, local MBMS bearer information, the method further includes sending, by the local MBMS functional entity, the destination IP address corresponding to the local MBMS bearer to the local application server by using a bearer setup response message.

Optionally, the method further includes deleting, by the local MBMS functional entity, the matched local MBMS bearer information.

Optionally, the deleting, by the local MBMS functional entity, the matched local MBMS bearer information includes receiving, by the local MBMS functional entity, deletion request message sent by the MBMS functional entity in the core network and used for requesting to delete the matched local MBMS bearer information, and deleting, by the local MBMS functional entity, the matched local MBMS bearer information according to the deletion request message.

Optionally, if the local MBMS functional entity includes the local BMSC_U and the local MBMS GW_U, the deletion request message includes a first deletion request message and a second deletion request message, and the deleting, by the local MBMS functional entity, the local MBMS bearer information according to the deletion request message includes deleting, by the local BMSC_U, local MBMS bearer information in the local BMSC_U according to the first deletion request message, and deleting, by the local MBMS GW_U, local MBMS bearer information in the local MBMS GW_U according to the second deletion request message.

An embodiment of the present application provides another data transmission method, where the method includes receiving, by an MBMS functional entity in a core network, a bearer request message, determining, by the MBMS functional entity in the core network, local MBMS bearer information according to the bearer request message, and sending, by the MBMS functional entity in the core network, the determined local MBMS bearer information to a local MBMS functional entity.

Optionally, the bearer request message is a bearer setup request message sent by a local application server, and after the determining, by the MBMS functional entity in the core network, local MBMS bearer information, the method further includes sending, by the MBMS functional entity in the core network, a bearer setup response message to the local application server.

Optionally, the local MBMS bearer information includes a destination IP address corresponding to a local MBMS bearer, and the bearer setup response message includes the destination IP address corresponding to the local MBMS bearer.

Optionally, the bearer setup request message includes identity information of the local application server and/or to-be-broadcast area information, and after the receiving, by an MBMS functional entity in a core network, a bearer request message, the method further includes determining, by the MBMS functional entity in the core network, identity information of the local MBMS functional entity according to the identity information of the local application server and/or the to-be-broadcast area information, and sending the identity information of the local MBMS functional entity to the local application server by using the bearer setup response message, or, if the local MBMS functional entity includes a local multimedia broadcast/multicast service gateway user plane MBMS GW_U and a local broadcast/multicast service center user plane BMSC_U, determining, by the MBMS functional entity in the core network, identity information of the local BMSC_U and identity information of the local MBMS GW_U according to the identity information of the local application server and/or the to-be-broadcast area information, and sending the identity information of the local BMSC_U to the local application server by using the bearer setup response message.

Optionally, the MBMS functional entity in the core network includes a broadcast/multicast service center BMSC in the core network and a multimedia broadcast/multicast service gateway MBMS GW in the core network, and the determining, by the MBMS functional entity in the core network, identity information of the local BMSC_U and identity information of the local MBMS GW_U according to the identity information of the local application server and/or the to-be-broadcast area information includes determining, by the BMSC in the core network, the identity information of the local BMSC_U and the identity information of the local MBMS GW_U according to the identity information of the local application server and/or the to-be-broadcast area information, or determining, by the BMSC in the core network, the identity information of the local BMSC_U according to the identity information of the local application server and/or the to-be-broadcast area information, and determining, by the MBMS GW in the core network, the identity information of the local MBMS GW_U according to the identity information of the local application server and/or the to-be-broadcast area information, or determining, by the MBMS GW in the core network, the identity information of the local BMSC_U and the identity information of the local MBMS GW_U according to the identity information of the local application server and/or the to-be-broadcast area information.

Optionally, the MBMS functional entity in the core network includes the BMSC in the core network and the MBMS GW in the core network, and the local MBMS bearer information includes first MBMS bearer information and second MBMS bearer information, and the determining, by the MBMS functional entity in the core network, local MBMS bearer information according to the bearer request message includes determining, by the BMSC in the core network, the first MBMS bearer information according to the bearer setup request message sent by the local application server, sending, by the BMSC in the core network, a session start request message to the MBMS GW in the core network, where the session start request message includes the first MBMS bearer information, and determining, by the MBMS GW in the core network, the second MBMS bearer information according to the session start request message.

Optionally, the first MBMS bearer information further includes the destination IP address corresponding to the local MBMS bearer.

Optionally, the session start request message further includes the identity information of the local MBMS GW_U determined by the BMSC in the core network or the identity information of the local MBMS functional entity.

Optionally, the sending, by the MBMS functional entity in the core network, the determined local MBMS bearer information to a local MBMS functional entity includes sending, by the MBMS GW in the core network, the determined first MBMS bearer information and second MBMS bearer information to the local MBMS functional entity by using an Mx1 interface between the BMSC in the core network and the local MBMS functional entity.

Optionally, the local MBMS functional entity includes the local MBMS GW_U and the local BMSC_U, and the sending, by the MBMS functional entity in the core network, the determined local MBMS bearer information to a local MBMS functional entity includes sending, by the BMSC in the core network, the first MBMS bearer information to the local BMSC_U by using an Mz interface between the local BMSC_U and the BMSC in the core network, and sending, by the MBMS GW in the core network, the first MBMS bearer information and the second MBMS bearer information to the local MBMS GW_U by using an Mx2 interface between the local MBMS GW_U and the MBMS GW in the core network.

Optionally, the local MBMS bearer information includes identity information of a local MBMS bearer, and the bearer request message is a bearer identity request message sent by the local MBMS functional entity, and the determining, by the MBMS functional entity in the core network, local MBMS bearer information according to the bearer request message includes determining, by the MBMS functional entity in the core network, the identity information of the local MBMS bearer according to the bearer identity request message sent by the local MBMS functional entity, and sending, by the MBMS functional entity in the core network, the identity information of the local MBMS bearer to the local MBMS functional entity.

Optionally, the bearer identity request message includes to-be-broadcast area information, and the determining, by the MBMS functional entity in the core network, the identity information of the local MBMS bearer according to the bearer identity request message includes determining, by the MBMS functional entity in the core network, the identity information of the local MBMS bearer according to the to-be-broadcast area information.

Optionally, the MBMS functional entity in the core network includes a BMSC in the core network and an MBMS GW in the core network, and the sending, by the MBMS functional entity in the core network, the determined local MBMS bearer information to a local MBMS functional entity includes sending, by the BMSC in the core network, the identity information of the local MBMS bearer to the local MBMS functional entity by using an My interface between the local MBMS functional entity and the BMSC in the core network.

Optionally, the method further includes determining, by the MBMS functional entity in the core network, to delete the local MBMS bearer information, and sending, by the MBMS functional entity in the core network to the local MBMS functional entity, deletion request message for deleting the local MBMS bearer information.

Optionally, the local MBMS functional entity includes the local MBMS GW_U and the local BMSC_U, the MBMS functional entity in the core network includes the BMSC in the core network and the MBMS GW in the core network, and the deletion request message includes a first deletion request message and a second deletion request message, and the sending, by the MBMS functional entity in the core network to the local MBMS functional entity, deletion request message for deleting the local MBMS bearer information includes sending, by the BMSC in the core network, the first deletion request message to the local BMSC_U by using the Mz interface between the local BMSC_U and the BMSC in the core network, and sending, by the MBMS GW in the core network, the second deletion request message to the local MBMS GW_U by using the Mx2 interface between the local MBMS GW_U and the MBMS GW in the core network.

An embodiment of the present application provides an MBMS functional entity, where the local MBMS functional entity includes a receiving module, configured to obtain local MBMS bearer information, and receive application layer data sent by a local application server, a processing module, configured to determine, based on the obtained local MBMS bearer information, local MBMS bearer information matching the application layer data, and a sending module, configured to send the application layer data based on the matched local MBMS bearer information.

Optionally, the receiving module is further configured to obtain a destination IP address of the application layer data, and the processing module is specifically configured to use the local MBMS bearer information including the destination IP address of the application layer data, as the matched local MBMS bearer information if the local MBMS bearer information includes the destination IP address of the application layer data.

Optionally, an MBMS functional entity in a core network includes a broadcast/multicast service center BMSC in the core network and a multimedia broadcast/multicast service gateway MBMS GW in the core network, and the receiving module is specifically configured to receive, by using an Mx1 interface between the local MBMS functional entity and the MBMS GW in the core network, the local MBMS bearer information sent by the MBMS GW in the core network.

Optionally, an MBMS functional entity in a core network includes a BMSC in the core network and an MBMS GW in the core network, the local MBMS functional entity includes a local broadcast/multicast service center user plane BMSC_U and a local multimedia broadcast/multicast service gateway user plane MBMS GW_U, the local MBMS bearer information includes first MBMS bearer information and second MBMS bearer information, and the receiving module includes a receiving module in the local BMSC_U and a receiving module in the local MBMS GW_U, where the receiving module in the local BMSC_U is specifically configured to receive the first MBMS bearer information by using an Mz interface between the local BMSC_U and the BMSC in the core network, and the receiving module in the local MBMS GW_U is specifically configured to receive the first MBMS bearer information and the second MBMS bearer information by using an Mx2 interface between the local MBMS GW_U and the MBMS GW in the core network.

Optionally, an MBMS functional entity in a core network includes a BMSC in the core network and an MBMS GW in the core network, and the local MBMS bearer information includes third MBMS bearer information and fourth MBMS bearer information, the receiving module is further configured to receive a bearer setup request message sent by the local application server, the sending module is further configured to send a bearer identity request message to the BMSC in the core network after the receiving module receives the bearer setup request message, the receiving module is specifically configured to: after the sending module sends the bearer identity request message, receive, by using an My interface between the local MBMS functional entity and the BMSC in the core network, the third MBMS bearer information sent by the BMSC in the core network, and the processing module is further configured to determine the fourth MBMS bearer information according to the bearer setup request message.

Optionally, the local MBMS bearer information includes a destination IP address corresponding to a local MBMS bearer, and the sending module is further configured to send the destination IP address corresponding to the local MBMS bearer to the local application server by using a bearer setup response message.

Optionally, the local MBMS functional entity further includes a deletion module, configured to delete the matched local MBMS bearer information.

Optionally, the receiving module is further configured to receive deletion request message sent by the MBMS functional entity in the core network and used for requesting to delete the matched local MBMS bearer information, and the deletion module is specifically configured to delete the matched local MBMS bearer information according to the deletion request message.

Optionally, if the local MBMS functional entity includes the local BMSC_U and the local MBMS GW_U, the deletion request message includes a first deletion request message and a second deletion request message, and the deletion module includes a deletion module in the local BMSC_U and a deletion module in the local MBMS GW_U, where the deletion module in the local BMSC_U is specifically configured to delete local MBMS bearer information in the local BMSC_U according to the first deletion request message, and the deletion module in the local MBMS GW_U is specifically configured to delete local MBMS bearer information in the local MBMS GW_U according to the second deletion request message.

An embodiment of the present application provides an MBMS functional entity in a core network, where the MBMS functional entity in the core network includes a receiving module, configured to receive a bearer request message, a processing module, configured to determine local MBMS bearer information according to the bearer request message, and a sending module, configured to send the determined local MBMS bearer information to a local MBMS functional entity.

Optionally, the bearer request message is a bearer setup request message sent by a local application server, and the sending module is further configured to send a bearer setup response message to the local application server.

Optionally, the local MBMS bearer information includes a destination IP address corresponding to a local MBMS bearer, and the bearer setup response message includes the destination IP address corresponding to the local MBMS bearer.

Optionally, the bearer setup request message includes identity information of the local application server and/or to-be-broadcast area information, and the processing module is further configured to determine identity information of the local MBMS functional entity according to the identity information of the local application server and/or the to-be-broadcast area information, and send, by using the sending module, the identity information of the local MBMS functional entity to the local application server by using the bearer setup response message, or if the local MBMS functional entity includes a local multimedia broadcast/ multicast service gateway user plane MBMS GW_U and a local broadcast/multicast service center user plane BMSC_U, determine identity information of the local BMSC_U and identity information of the local MBMS GW_U according to the identity information of the local application server and/or the to-be-broadcast area information, and send, by using the sending module, the identity information of the local BMSC_U to the local application server by using the bearer setup response message.

Optionally, the MBMS functional entity in the core network includes a broadcast/multicast service center BMSC in the core network and a multimedia broadcast/multicast service gateway MBMS GW in the core network, and the processing module includes a processing module in the BMSC in the core network and a processing module in the MBMS GW in the core network, where the processing module in the BMSC in the core network is configured to determine the identity information of the local BMSC_U and the identity information of the local MBMS GW_U according to the identity information of the local application server and/or the to-be-broadcast area information, or the processing module in the BMSC in the core network is configured to determine the identity information of the local BMSC_U according to the identity information of the local application server and/or the to-be-broadcast area information, and the processing module in the MBMS GW in the core network is configured to determine the identity information of the local MBMS GW_U according to the identity information of the local application server and/or the to-be-broadcast area information, or the processing module in the MBMS GW in the core network is configured to determine the identity information of the local BMSC_U and the identity information of the local MBMS GW_U according to the identity information of the local application server and/or the to-be-broadcast area information.

Optionally, the MBMS functional entity in the core network includes the BMSC in the core network and the MBMS GW in the core network, the local MBMS bearer information includes first MBMS bearer information and second MBMS bearer information, the processing module includes the processing module in the BMSC in the core network and the processing module in the MBMS GW in the core network, and the sending module includes a sending module in the BMSC in the core network and a sending module in the MBMS GW in the core network, where the processing module in the BMSC in the core network determines the first MBMS bearer information according to the bearer setup request message sent by the local application server, the sending module in the BMSC in the core network is further configured to send a session start request message to the MBMS GW in the core network, where the session start request message includes the first MBMS bearer information, and the processing module in the MBMS GW in the core network determines the second MBMS bearer information according to the session start request message.

Optionally, the first MBMS bearer information further includes the destination IP address corresponding to the local MBMS bearer.

Optionally, the session start request message further includes the identity information of the local MBMS GW_U determined by the BMSC in the core network or the identity information of the local MBMS functional entity. Optionally, the sending module in the MBMS GW in the core network is specifically configured to send the determined first MBMS bearer information and second MBMS bearer information to the local MBMS functional entity by using an Mx1 interface between the BMSC in the core network and the local MBMS functional entity.

Optionally, the local MBMS functional entity includes the local MBMS GW_U and the local BMSC_U, the sending module in the BMSC in the core network sends the first MBMS bearer information to the local BMSC_U by using an Mz interface between the local BMSC_U and the BMSC in the core network, and the sending module in the MBMS GW in the core network sends the first MBMS bearer information and the second MBMS bearer information to the local MBMS GW_U by using an Mx2 interface between the local MBMS GW_U and the MBMS GW in the core network.

Optionally, the local MBMS bearer information includes identity information of a local MBMS bearer, and the bearer request message is a bearer identity request message sent by the local MBMS functional entity, the processing module is specifically configured to determine the identity information of the local MBMS bearer according to the bearer identity request message sent by the local MBMS functional entity, and the sending module is specifically configured to send the identity information of the local MBMS bearer to the local MBMS functional entity.

Optionally, the bearer identity request message includes to-be-broadcast area information, and the processing module is specifically configured to determine the identity information of the local MBMS bearer according to the to-be-broadcast area information.

Optionally, the MBMS functional entity in the core network includes a BMSC in the core network and an MBMS GW in the core network, and the sending module includes a sending module in the BMSC in the core network and a sending module in the MBMS GW in the core network, where the sending module in the BMSC in the core network sends the identity information of the local MBMS bearer to the local MBMS functional entity by using an My interface between the local MBMS functional entity and the BMSC in the core network.

Optionally, the MBMS functional entity in the core network further includes a deletion module, configured to determine to delete the local MBMS bearer information, and the sending module is further configured to send, to the local MBMS functional entity, deletion request message for deleting the local MBMS bearer information.

Optionally, the local MBMS functional entity includes the local MBMS GW_U and the local BMSC_U, the MBMS functional entity in the core network includes the BMSC in the core network and the MBMS GW in the core network, and the deletion request message includes a first deletion request message and a second deletion request message, and the sending module includes the sending module in the BMSC in the core network and the sending module in the MBMS GW in the core network, where the sending module in the BMSC in the core network sends the first deletion request message to the local BMSC_U by using the Mz interface between the local BMSC_U and the BMSC in the core network, and the sending module in the MBMS GW in the core network sends the second deletion request message to the local MBMS GW_U by using the Mx2 interface between the local MBMS GW_U and the MBMS GW in the core network.

An embodiment of the present application provides an MBMS functional entity, where the local MBMS functional entity includes a processor and a memory, where the processor is configured to: obtain local MBMS bearer information, receive application layer data sent by a local application server, determine, based on the obtained local MBMS bearer information, local MBMS bearer information matching the application layer data, and send the application layer data based on the matched local MBMS bearer information.

Optionally, the processor is further configured to: obtain a destination IP address of the application layer data, and use the local MBMS bearer information including the destination IP address of the application layer data, as the matched local MBMS bearer information if the local MBMS bearer information includes the destination IP address of the application layer data.

Optionally, an MBMS functional entity in a core network includes a broadcast/multicast service center BMSC in the core network and a multimedia broadcast/multicast service gateway MBMS GW in the core network, and the processor is specifically configured to receive, by using an Mx1 interface between the local MBMS functional entity and the MBMS GW in the core network, the local MBMS bearer information sent by the MBMS GW in the core network.

Optionally, an MBMS functional entity in a core network includes a BMSC in the core network and an MBMS GW in the core network, the local MBMS functional entity includes a local broadcast/multicast service center user plane BMSC_U and a local multimedia broadcast/multicast service gateway user plane MBMS GW_U, the local MBMS bearer information includes first MBMS bearer information and second MBMS bearer information, and the processor includes a processor in the local BMSC_U and a processor in the local MBMS GW_U, where the processor in the local BMSC_U is specifically configured to receive the first MBMS bearer information by using an Mz interface between the local BMSC_U and the BMSC in the core network, and the processor in the local MBMS GW_U is specifically configured to receive the first MBMS bearer information and the second MBMS bearer information by using an Mx2 interface between the local MBMS GW_U and the MBMS GW in the core network.

Optionally, an MBMS functional entity in a core network includes a BMSC in the core network and an MBMS GW in the core network, and the local MBMS bearer information includes third MBMS bearer information and fourth MBMS bearer information, the processor is configured to: receive a bearer setup request message sent by the local application server, send a bearer identity request message to the BMSC in the core network, and receive, by using an My interface between the local MBMS functional entity and the BMSC in the core network, the third MBMS bearer information sent by the BMSC in the core network, and the processor is further configured to determine the fourth MBMS bearer information according to the bearer setup request message.

Optionally, the local MBMS bearer information includes a destination IP address corresponding to a local MBMS bearer, and the processor is further configured to send the destination IP address corresponding to the local MBMS bearer to the local application server by using a bearer setup response message.

Optionally, the processor is further configured to delete the matched local MBMS bearer information.

Optionally, the processor is specifically configured to receive deletion request message sent by the MBMS functional entity in the core network and used for requesting to delete the matched local MBMS bearer information, and delete the matched local MBMS bearer information according to the deletion request message.

Optionally, if the local MBMS functional entity includes the local BMSC_U and the local MBMS GW_U, the deletion request message includes a first deletion request message and a second deletion request message, and the processor includes a processor in the local BMSC_U and a processor in the local MBMS GW_U, where the processor in the local BMSC_U is specifically configured to delete local MBMS bearer information in the local BMSC_U according to the first deletion request message, and the processor in the local MBMS GW_U is specifically configured to delete local MBMS bearer information in the local MBMS GW_U according to the second deletion request message.

An embodiment of the present application provides an MBMS functional entity in a core network, where the MBMS functional entity in the core network includes a processor and a memory, where the processor is configured to receive a bearer request message, determine local MBMS bearer information according to the bearer request message, and send the determined local MBMS bearer information to a local MBMS functional entity.

Optionally, the bearer request message is a bearer setup request message sent by a local application server, and the processor is further configured to send a bearer setup response message to the local application server.

Optionally, the local MBMS bearer information includes a destination IP address corresponding to a local MBMS bearer, and the bearer setup response message includes the destination IP address corresponding to the local MBMS bearer.

Optionally, the bearer setup request message includes identity information of the local application server and/or to-be-broadcast area information, and the processor is further configured to determine identity information of the local MBMS functional entity according to the identity information of the local application server and/or the to-be-broadcast area information, and send the identity information of the local MBMS functional entity to the local application server by using the bearer setup response message, or, if the local MBMS functional entity includes a local multimedia broadcast/multicast service gateway user plane MBMS GW_U and a local broadcast/multicast service center user plane BMSC_U, determine identity information of the local BMSC_U and identity information of the local MBMS GW_U according to the identity information of the local application server and/or the to-be-broadcast area information, and send the identity information of the local BMSC_U to the local application server by using the bearer setup response message.

Optionally, the MBMS functional entity in the core network includes a broadcast/multicast service center BMSC in the core network and a multimedia broadcast/multicast service gateway MBMS GW in the core network, and the processor includes a processor in the BMSC in the core network and a processor in the MBMS GW in the core network, where the processor in the BMSC in the core network is configured to determine the identity information of the local BMSC_U and the identity information of the local MBMS GW_U according to the identity information of the local application server and/or the to-be-broadcast area information, or the processor in the BMSC in the core network is configured to determine the identity information of the local BMSC_U according to the identity information of the local application server and/or the to-be-broadcast area information, and the processor in the MBMS GW in the core network is configured to determine the identity information of the local MBMS GW_U according to the identity information of the local application server and/or the to-be-broadcast area information, or the processor in the MBMS GW in the core network is configured to determine the identity information of the local BMSC_U and the identity information of the local MBMS GW_U according to the identity information of the local application server and/or the to-be-broadcast area information.

Optionally, the MBMS functional entity in the core network includes the BMSC in the core network and the MBMS GW in the core network, the local MBMS bearer information includes first MBMS bearer information and second MBMS bearer information, and the processor includes the processor in the BMSC in the core network and the processor in the MBMS GW in the core network, where the processor in the BMSC in the core network determines the first MBMS bearer information according to the bearer setup request message sent by the local application server, and sends a session start request message to the MBMS GW in the core network, where the session start request message includes the first MBMS bearer information, and the processor in the MBMS GW in the core network determines the second MBMS bearer information according to the session start request message.

Optionally, the first MBMS bearer information further includes the destination IP address corresponding to the local MBMS bearer.

Optionally, the session start request message further includes the identity information of the local MBMS GW_U determined by the BMSC in the core network or the identity information of the local MBMS functional entity. Optionally, the processor in the MBMS GW in the core network is specifically configured to send the determined first MBMS bearer information and second MBMS bearer information to the local MBMS functional entity by using an Mx1 interface between the BMSC in the core network and the local MBMS functional entity.

Optionally, the local MBMS functional entity includes the local MBMS GW_U and the local BMSC_U, the processor in the BMSC in the core network sends the first MBMS bearer information to the local BMSC_U by using an Mz interface between the local BMSC_U and the BMSC in the core network, and the processor in the MBMS GW in the core network sends the first MBMS bearer information and the second MBMS bearer information to the local MBMS GW_U by using an Mx2 interface between the local MBMS GW_U and the MBMS GW in the core network.

Optionally, the local MBMS bearer information includes identity information of a local MBMS bearer, and the bearer request message is a bearer identity request message sent by the local MBMS functional entity, and the processor is specifically configured to determine the identity information of the local MBMS bearer according to the bearer identity request message sent by the local MBMS functional entity, and send the identity information of the local MBMS bearer to the local MBMS functional entity.

Optionally, the bearer identity request message includes to-be-broadcast area information, and the processor is specifically configured to determine the identity information of the local MBMS bearer according to the to-be-broadcast area information.

Optionally, the MBMS functional entity in the core network includes a BMSC in the core network and an MBMS GW in the core network, and the processor includes a processor in the BMSC in the core network and a processor in the MBMS GW in the core network, where the processor in the BMSC in the core network sends the identity information of the local MBMS bearer to the local MBMS functional entity by using an My interface between the local MBMS functional entity and the BMSC in the core network.

Optionally, the processor is further configured to determine to delete the local MBMS bearer information, and send, to the local MBMS functional entity, deletion request message for deleting the local MBMS bearer information.

Optionally, the local MBMS functional entity includes the local MBMS GW_U and the local BMSC_U, the MBMS functional entity in the core network includes the BMSC in the core network and the MBMS GW in the core network, and the deletion request message includes a first deletion request message and a second deletion request message, and the processor includes the processor in the BMSC in the core network and the processor in the MBMS GW in the core network, where the processor in the BMSC in the core network sends the first deletion request message to the local BMSC_U by using the Mz interface between the local BMSC_U and the BMSC in the core network, and the processor in the MBMS GW in the core network sends the second deletion request message to the local MBMS GW_U by using the Mx2 interface between the local MBMS GW_U and the MBMS GW in the core network.

In the embodiments of the present application, the local MBMS functional entity obtains the local MBMS bearer information by using the interface between the local MBMS functional entity and the MBMS functional entity in the core network, and after receiving the application layer data sent by the local application server, the local MBMS functional entity determines the local MBMS bearer information matching the application layer data, and sends the application layer data based on the local MBMS bearer information matching the application layer data. In the embodiments of the present application, the local MBMS functional entity first obtains the local MBMS bearer information, and sends the application layer data based on the local MBMS bearer information matching the application layer data. In comparison with the prior art, in the embodiments of the present application, there is no need to transmit the application layer data to a core network, thereby reducing a delay in transmission of the local application layer data, reducing bandwidth of the core network used by the local application layer data, and increasing a service capacity of a whole network.

BRIEF DESCRIPTION OF THE DRAWINGS

To describe the technical solutions in the embodiments of the present application more clearly, the following briefly describes the accompanying drawings required for describing the embodiments.

DETAILED DESCRIPTION OF ILLUSTRATIVE EMBODIMENTS

To make the objectives, technical solutions, and advantages of the present application clearer, the following further describes the present application in detail with reference to the accompanying drawings. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
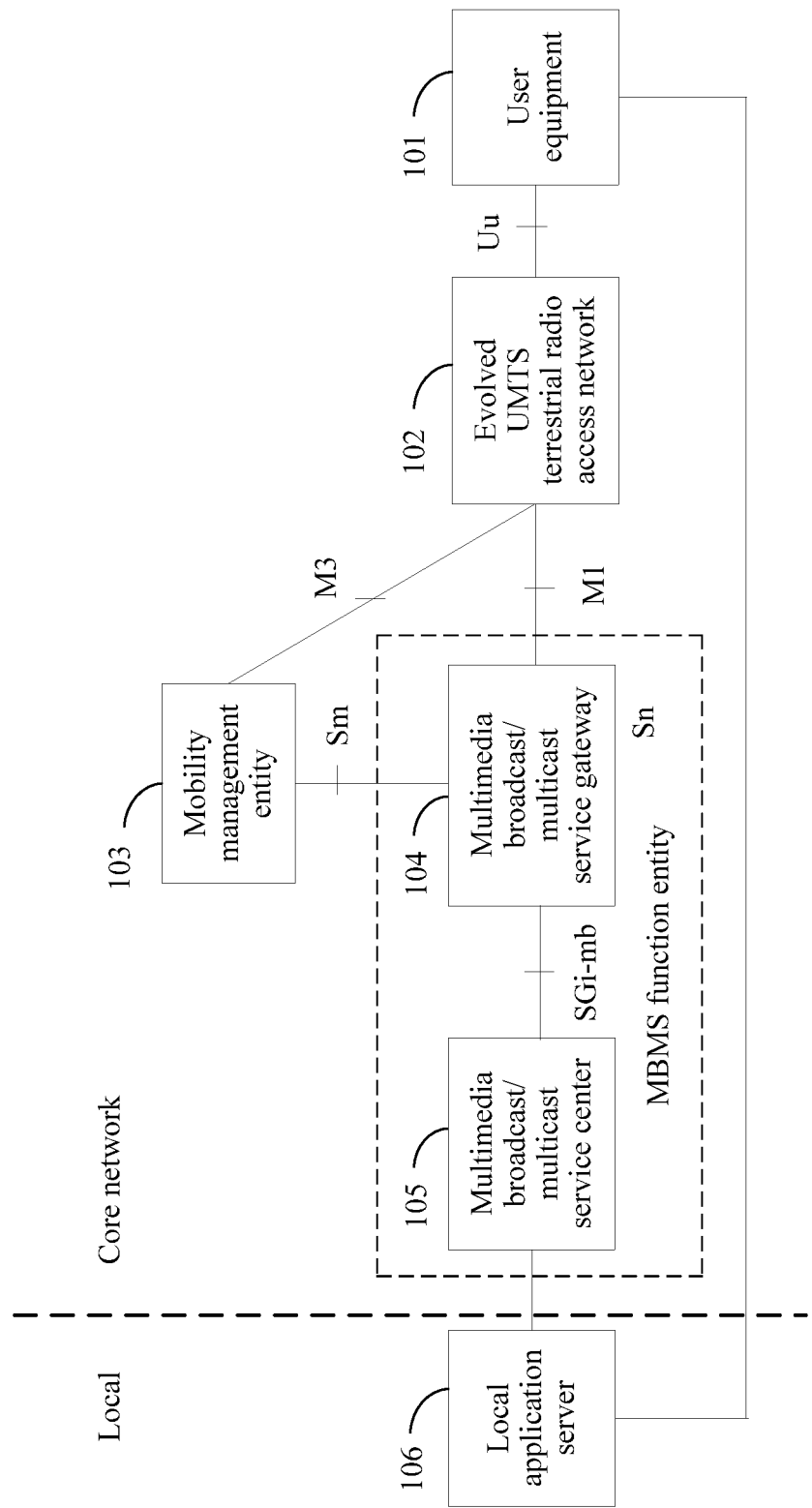
FIG. 1 is a schematic diagram of an existing wireless network architecture supporting an MBMS.

FIG. 1 is a schematic diagram of an existing wireless network architecture supporting an MBMS. As shown in FIG. 1, a 3GPP (3rd Generation Partnership Project) system architecture supporting an eMBMS includes the following network elements and devices.

User equipment (UE) 101: It supports an activation/deactivation function of an MBMS bearer service. In this embodiment of the present application, the user equipment is a device providing voice and/or data connectivity for a user, and includes a wireless terminal and a wired terminal. The wireless terminal may be a handheld device having a wireless connection function, or another processing device connected to a wireless modem, or a mobile terminal that communicates with one or more core networks through a radio access network. For example, the wireless terminal may be a mobile phone (or referred to as a "cellular" phone) and a computer having a mobile terminal. For another example, the wireless terminal may also be a portable, pocket-sized, handheld, computer built-in, or in-vehicle mobile device.

Evolved Universal Mobile Telecommunications System (UMTS) terrestrial radio access network (Evolved UMTS Terrestrial Radio Access Network, E-UTRAN) 102: It is configured to implement functions related to a wireless evolved network, and transmit MBMS data to a specified MBMS service area.

Mobility management entity (MME) 103: It is responsible for mobility management of a control plane, for example, management of a UE context and a moving state and allocation of a temporary identity of a user.

MBMS gateway (MBMS GW) 104: It provides an SGi-mb interface between the MBMS GW 104 and a multimedia broadcast/multicast service center (BMSC) 105, performs GPRS Tunneling Protocol User Plane (GTPU) encapsulation on MBMS session service data of the SGi-mb interface, performs multicast distribution on an M1 interface to an evolved NodeB (eNB), and provides functions such as allocation of a multicast destination IP address.

BMSC 105: It is configured to store subscription data, generate a charging record, manage a member (Gi interface), and determine a time table for transmission in an MBMS session, determine a time table for retransmission in the MBMS session, identify each MBMS session, and allocate a temporary mobile group identity (TMGI) to a temporary mobile group of each MBMS bearer, provide transmission related parameters for a gateway GPRS support node (GGSN), such as quality of service (QoS) and an MBMS service area, initiate or terminate an MBMS bearer resource, and send MBMS data and have functions such as an error resilience policy. The MBMS GW 104 and the BMSC 105 jointly form the MBMS functional entity in the core network.

Local application server 106: It is a server providing various application services for the user equipment.

Figure 2:
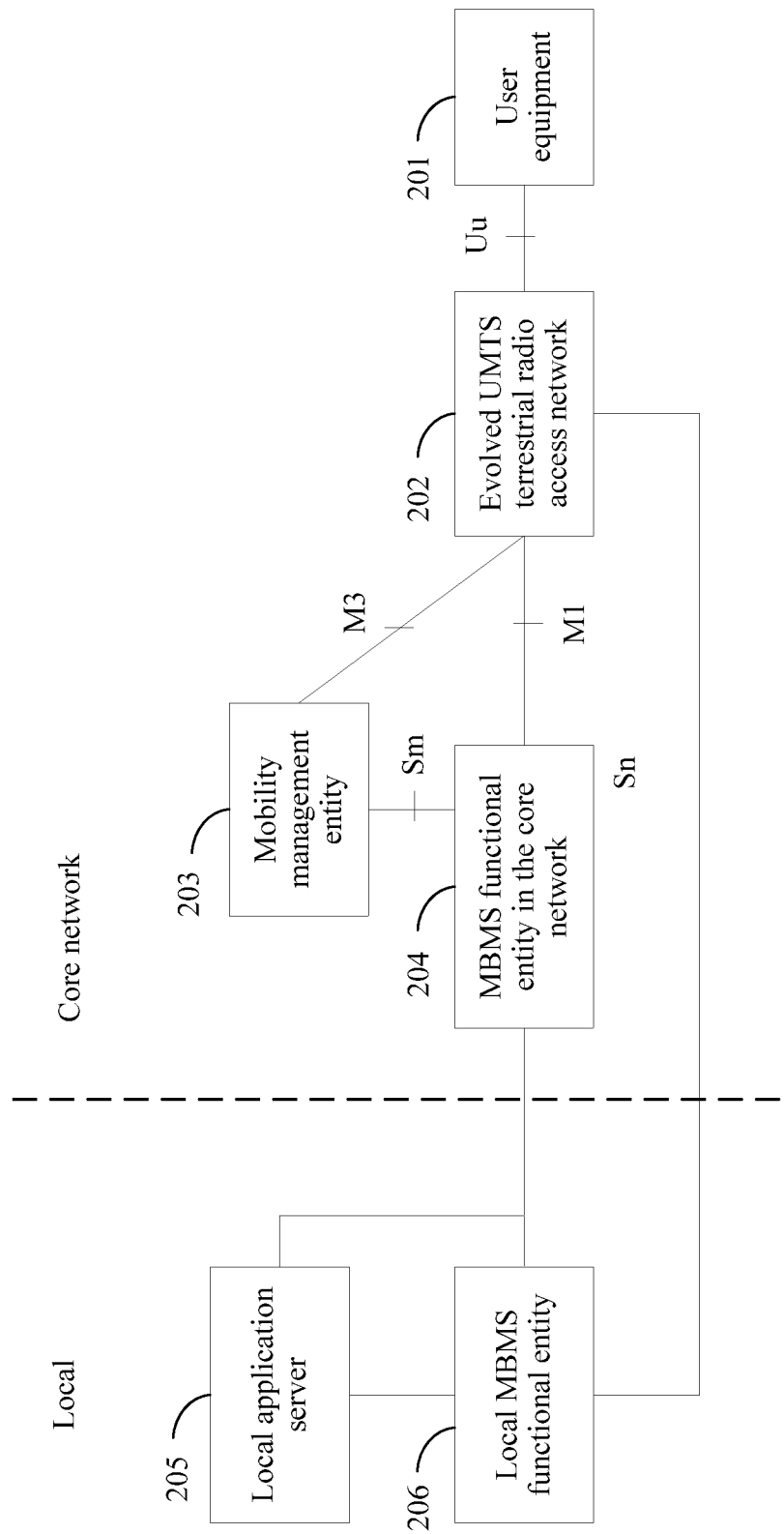
FIG. 2 is a schematic diagram of a network architecture according to an embodiment of the present application.

In view of this problem, an embodiment of the present application provides a data transmission method. FIG. 2 is a schematic diagram of a network architecture according to an embodiment of the present application. As shown in FIG. 2, the network architecture includes user equipment 201, an evolved UMTS terrestrial radio access network 202, a mobility management entity 203, and an MBMS functional entity 204 in a core network. Connection relationships between the network elements and the devices and functions thereof are the same as those in the prior art. For their connection relationships and functions, refer to FIG. 1 and descriptions about FIG. 1. Details are not further described herein.

A local MBMS functional entity 206 is added in FIG. 2. A local application server 205 communicates with the local MBMS functional entity 206, and sends application layer data by using the local MBMS functional entity 206, so that there is no need to transmit the application layer data to a core network, thereby reducing a delay in transmission of the local application layer data, reducing bandwidth of the core network used by the local application layer data, and increasing a service capacity of a whole network.

Figure 3:
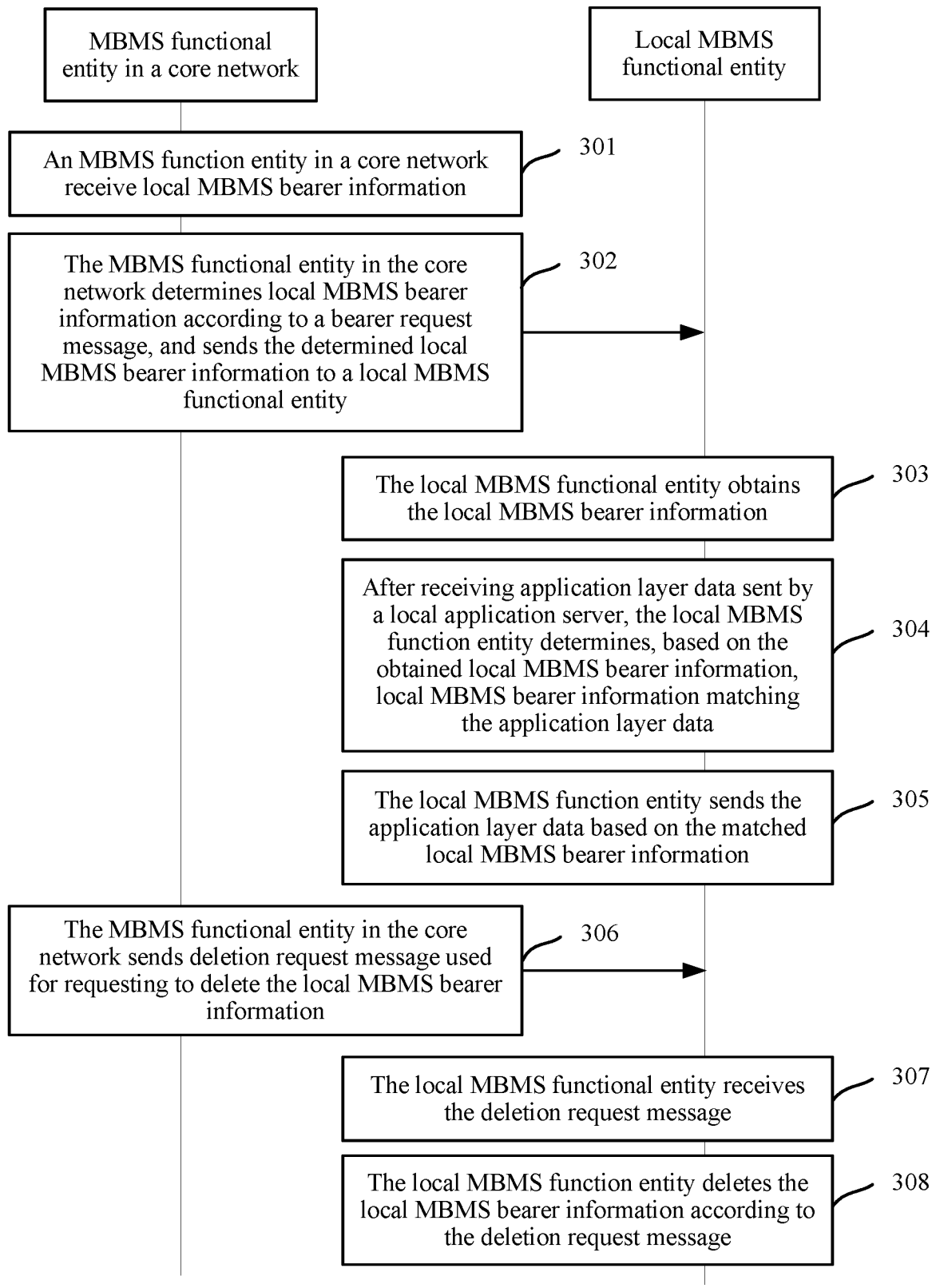
FIG. 3 is a schematic flowchart of a data transmission method according to an embodiment of the present application.

Based on the network architecture shown in FIG. 2, FIG. 3 is a schematic flowchart of a data transmission method according to an embodiment of the present application. As shown in FIG. 3, the method includes the following steps.

Step 301: An MBMS functional entity in a core network receives a bearer request message.

Step 302: The MBMS functional entity in the core network determines local MBMS bearer information according to the bearer request message, and sends the determined local MBMS bearer information to a local MBMS functional entity.

The local MBMS bearer information includes at least identity information of a local MBMS bearer, and the identity information of the local MBMS bearer may be a TMGI and a destination IP address of the local MBMS bearer. The local MBMS bearer information may be specifically a context of the local MBMS bearer, for example, may include the identity information of the local MBMS bearer, and may further include QoS, M1 interface identity information, and the like.

Step 303: The local MBMS functional entity obtains the local MBMS bearer information.

Step 304: After receiving application layer data sent by a local application server, the local MBMS functional entity determines, based on the obtained local MBMS bearer information, local MBMS bearer information matching the application layer data.

When the local MBMS bearer information matching the application layer data is determined based on the obtained local MBMS bearer information in step 304, specifically, matching may be performed by using a destination IP address of the application layer data, or matching may be performed by using a tunnel identifier for sending the application layer data. This is not limited.

For example, that the local MBMS functional entity determines local MBMS bearer information matching the application layer data includes: the local MBMS functional entity obtains an IP address of the application layer data, and if the local MBMS bearer information includes the IP address of the application layer data, uses the local MBMS bearer information including the IP address of the application layer data, as the matched local MBMS bearer information.

Step 305: The local MBMS functional entity sends the application layer data based on the local MBMS bearer information matching the application layer data.

In this embodiment of the present application, the local MBMS functional entity first obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

Further, when the MBMS functional entity in the core network determines that the local MBMS bearer information needs to be deleted, for example, when the MBMS functional entity in the core network determines that use of the local MBMS bearer is complete, the method further includes the following steps.

Step 306: The MBMS functional entity in the core network sends deletion request message used for requesting to delete the local MBMS bearer information.

Step 307: The local MBMS functional entity receives the deletion request message.

Step 308: The local MBMS functional entity deletes the local MBMS bearer information according to the deletion request message.

It should be noted that, in this embodiment of the present application, the local MBMS functional entity may also determine whether the local MBMS bearer information needs to be deleted. For example, after the local MBMS functional entity determines that use of the local MBMS bearer is complete, the local MBMS functional entity may actively delete the local MBMS bearer information, and report a result of active deletion to the MBMS functional entity in the core network, or after the local MBMS functional entity determines that use of the local MBMS bearer is complete, the local MBMS functional entity may actively report that use of the local MBMS bearer is complete to the MBMS functional entity in the core network, to trigger the MBMS functional entity in the core network to send a deletion request message.

In this embodiment of the present application, in the foregoing process, local MBMS bearer information that is already created in the local MBMS functional entity may be deleted according to an actual situation and a specific requirement, so as to save storage space in the local MBMS functional entity, effectively reduce a time of matching between the local MBMS bearer information and the application layer data, and improve processing efficiency of the local MBMS functional entity.

Specifically, in this embodiment of the present application, an interface between the local MBMS functional entity and the MBMS functional entity in the core network may be any one of a first interface, a second interface, and a third interface. The first interface is an Mx1 interface between the local MBMS functional entity and the MBMS GW in the core network, the second interface includes an Mx2 interface between a local MBMS GW_U and an MBMS GW in the core network and an Mz interface between a local BMSC_U and a BMSC in the core network, the local MBMS GW_U and the local BMSC_U are obtained by splitting the local MBMS functional entity, the third interface is an My interface between the local MBMS functional entity and the BMSC in the core network, the BMSC in the core network and the MBMS GW in the core network are obtained by splitting the MBMS functional entity in the core network.

It should be pointed out that, the foregoing method is also applicable to a future 5th generation mobile communications system (that is, a 5G system). In the future 5G system, a function performed by the MBMS functional entity in the core network may be implemented on an entity for performing a 5G control plane function, and a function performed by the local MBMS functional entity may also be implemented on a 5G user plane forwarding entity.

The following describes in detail a scenario in which an interface between a local MBMS functional entity and an MBMS functional entity in a core network is a first interface, a second interface, or a third interface.

Scenario 1: An interface between a local MBMS functional entity and an MBMS functional entity in a core network is a first interface.

Figure 4:
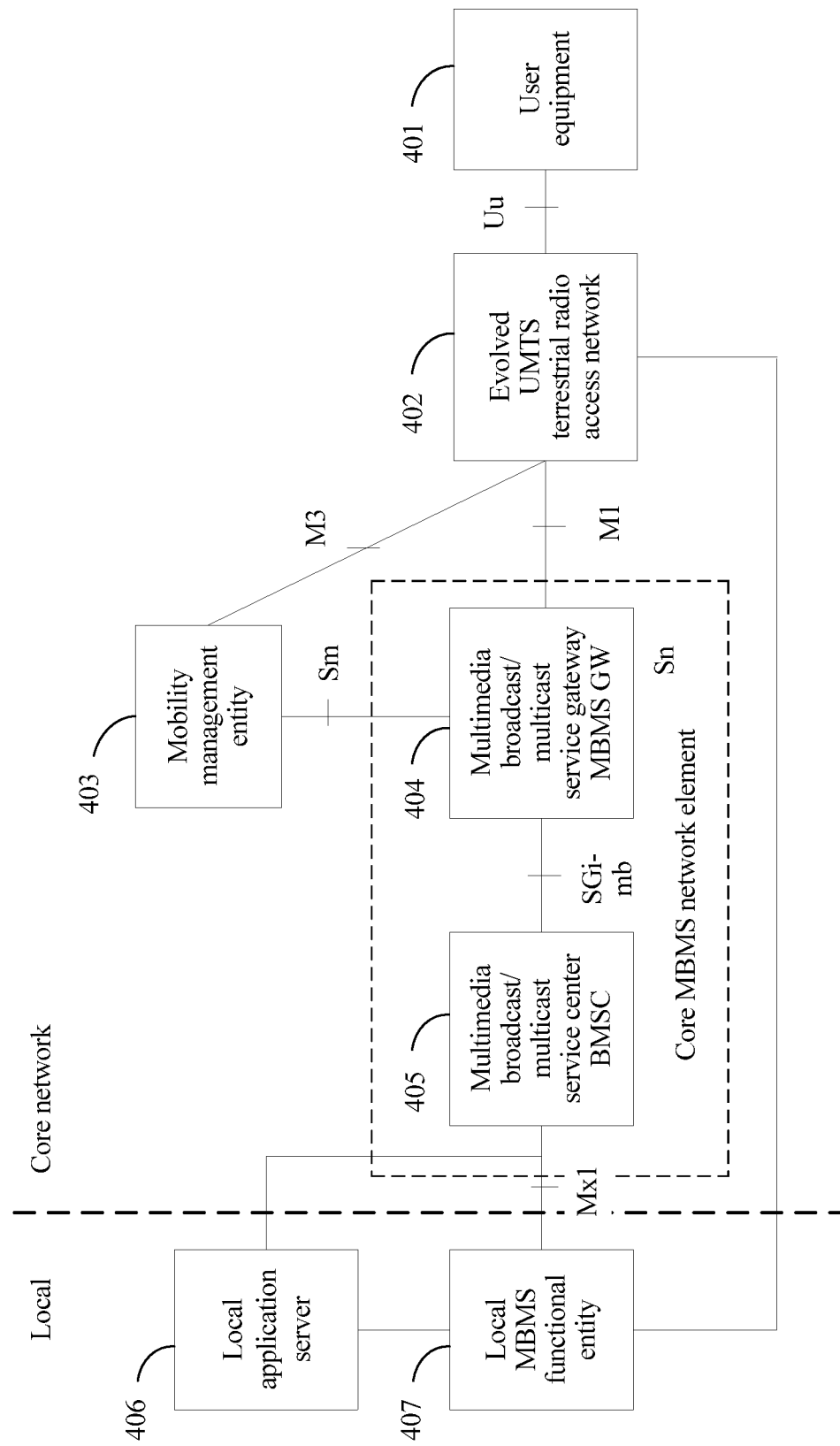
FIG. 4 is a schematic diagram of another network architecture according to an embodiment of the present application.

Based on the network architecture shown in FIG. 2, FIG. 4 illustrates a schematic diagram of a network architecture applicable to the scenario 1. As shown in FIG. 4, the network architecture includes user equipment 401, an evolved UMTS terrestrial radio access network 402, a mobility management entity 403, an MBMS GW 404 in a core network, a BMSC 405 in the core network, a local application server 406, and a local MBMS functional entity 407. The MBMS GW 404 in the core network and the BMSC 405 in the core network are obtained by splitting an MBMS functional entity in the core network.

The local MBMS functional entity only needs to perform a user plane data forwarding function. The MBMS functional entity in the core network is mainly responsible for performing signaling interaction between an MME and the local application server to create local MBMS bearer information, and sending the created MBMS bearer information to the local MBMS functional entity, so that the local MBMS functional entity sends, after receiving application layer data sent by the local application server, the application layer data based on the local MBMS bearer information matching the application layer data.

The local MBMS functional entity includes the following two subfunctions.

Subfunction 1: That is, functions performed by a local BMSC_U: mainly performing user plane related functions performed by the BMSC, for example, performing some functions related to MBMS data transmission, being responsible for receiving the application layer data, performing some necessary processing (encryption, recoding, and the like) on the application layer data, then forwarding the application layer data to a local MBMS GW_U, and generating a charging record when charging is required, performing a security function, and performing a data content synchronization function.

It should be pointed out that, in the performed functions related to MBMS data transmission, functions (including data encryption, coding processing, charging record, security, and synchronization functions) other than forwarding the application layer data to the local MBMS GW_U may all be optional functions.

Subfunction 2: That is, functions performed by the local MBMS GW_U: mainly performing user plane related functions performed by the MBMS GW, for example, distributing the application layer data (sending broadcast data in IP multicast mode) on an M1 interface according to context information determined when a local MBMS bearer is set up.

The MBMS functional entity in the core network is responsible for performing all MBMS control plane functions, for example, various control functions required in a process of setting up an MBMS bearer, and specifically, all functions implemented in the BMSC other than the local BMSC-U, and all functions implemented in the MBMS GW other than the local MBMS GW_U.

Specifically, an interface between the local MBMS functional entity and the MBMS functional entity in the core network is a first interface, and the local MBMS bearer information is determined by the MBMS functional entity in the core network according to a bearer setup request message sent by the local application server. The local MBMS bearer information may include parameter information determined when each network element or device (for example, the MBMS GW in the core network and the BMSC in the core network) sets up a local MBMS bearer, for example, identity information of the local MBMS bearer, M1 interface identity information, QoS, and a tunnel identifier for sending the application layer data. According to different objects for determining the local MBMS bearer information, the local MBMS bearer information may be classified into first MBMS bearer information and second MBMS bearer information.

The first MBMS bearer information is determined by the BMSC in the core network according to the received bearer setup request message sent by the local application server, and is sent to the MBMS GW in the core network by using a session start request message, for example, identity information of the local MBMS bearer, and QoS.

The second MBMS bearer information is determined by the MBMS GW in the core network according to the received session start request message sent by the BMSC in the core network, and optionally, is sent to the BMSC in the core network by using a session start response message, for example, the M1 interface identity information.

Figure 5A:
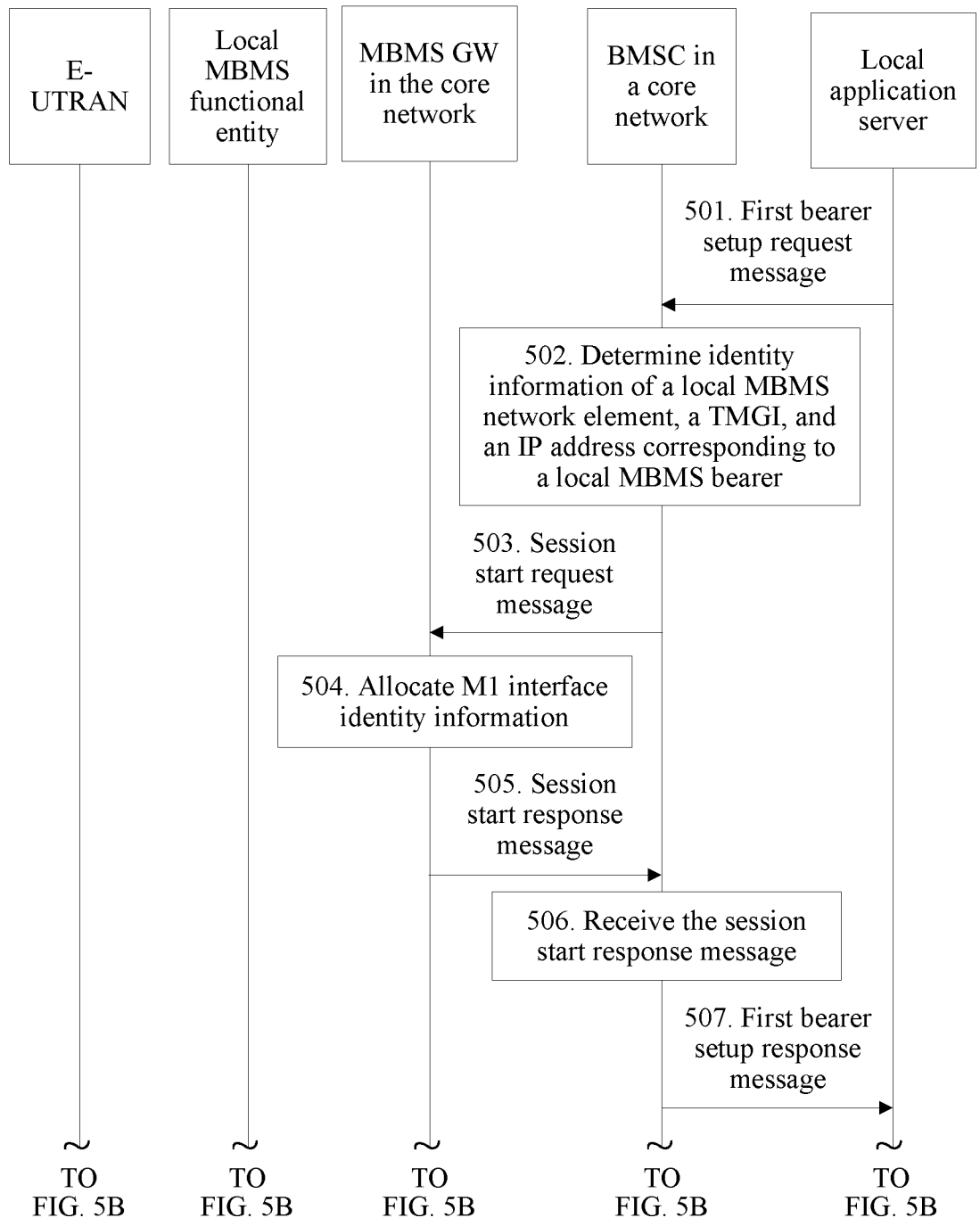
FIG. 5A and FIG. 5B are a schematic flowchart of another data transmission method according to an embodiment of the present application.
Figure 5B:
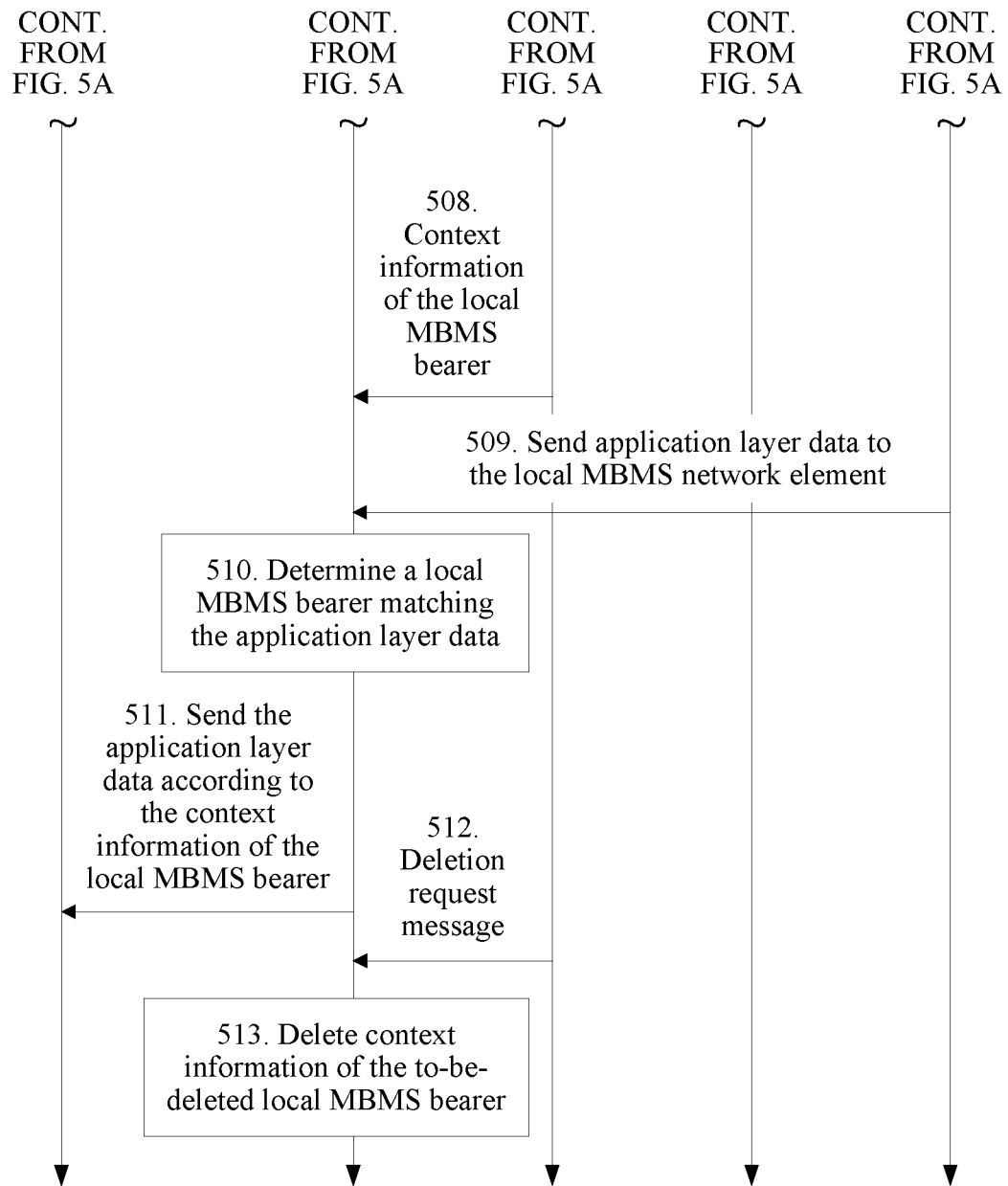

Based on the network architecture shown in FIG. 4, FIG. 5A and FIG. 5B are a schematic flowchart of a data transmission method according to an embodiment of the present application. As shown in FIG. 5A and FIG. 5B, the method includes the following steps.

Step 501: A local application server sends a bearer setup request message to a BMSC in a core network.

Step 502: The BMSC in the core network receives the bearer setup request message, determines, according to the bearer setup request message, identity information of a local MBMS functional entity configured to perform user plane data transmission, and allocates, according to a service requirement carried in the bearer setup request message, QoS required by an MBMS bearer and identity information of a local MBMS bearer.

The bearer setup request message may be specifically received by using an MB2-C interface.

Alternatively, the bearer setup request message carries identity information of the local application server and/or to-be-broadcast area information, and an alternative step is performed: The BMSC in the core network determines, according to the identity information of the local application server and/or the to-be-broadcast area information, identity information of a local MBMS functional entity configured to perform user plane data transmission. In other words, the alternative step may replace step 502. Obviously, after step 502, an alternative step may be further performed. This is not limited.

The identity information of the local application server may be an address of the local application server or other information used to uniquely identify the local application server. The identity information of the local MBMS functional entity may be address information of the local MBMS functional entity, or may be any identity that is mapped to an address of a network element and uniquely identifies the network element. The to-be-broadcast area information is used to indicate a to-be-broadcast area, and may be specifically physical location information of the to-be-broadcast area, or an identity of a cell, or may be other information that is used to uniquely identify the to-be-broadcast area, for example, information that may assist the BMSC in the core network in determining a location of the to-be-broadcast area.

Specifically, the identity information of the local MBMS bearer may include a TMGI and a destination IP address corresponding to the local MBMS bearer. The TMGI may be determined in a plurality of manners. For example, after receiving the bearer setup request message, the BMSC in the core network first determines whether the bearer setup request message carries a TMGI, when determining that the bearer setup request message carries a TMGI (the carried TMGI may be a group of available TMGIs obtained by the local application server), obtains the TMGI, and verifies whether the TMGI is legal (for example, whether use of the TMGI is authorized), if the TMGI is legal, the BMSC in the core network uses the TMGI as the identity information of the local MBMS bearer, if the TMGI is illegal, the BMSC in the core network temporarily allocates a group of TMGIs as the identity information of the local MBMS bearer, when determining that the bearer setup request message does not carry the TMGI, the BMSC in the core network temporarily allocates a group of TMGIs as the identity information of the local MBMS bearer.

Likewise, the destination IP address corresponding to the local MBMS bearer may also be determined in a plurality of manners. For example, after receiving the bearer setup request message, the BMSC in the core network first determines whether the bearer setup request message carries an IP address, obtains the IP address when determining that the bearer setup request message carries an IP address (the carried IP address may be an available IP address obtained by the local application server from the BMSC in the core network, or an IP address directly allocated by the local application server), verifies whether the IP address is legal (for example, whether the IP address can be used), and if the IP address is legal, uses the IP address as the identity information of the local MBMS bearer, or if the IP address is illegal, the BMSC in the core network temporarily allocates an IP address as the identity information of the local MBMS bearer. When determining that the bearer setup request message does not carry an IP address, the BMSC in the core network temporarily allocates an IP address as the identity information of the local MBMS bearer. In this embodiment of the present application, the destination IP address corresponding to the local MBMS bearer is an IP multicast address.

Step 503: The BMSC in the core network sends a session start request message to an MBMS GW in the core network.

The session start request message may include local MBMS bearer information determined in step 502, for example, the identity information of the local MBMS functional entity and the identity information of the local MBMS bearer.

Step 504: The MBMS GW in the core network allocates, according to the received session start request message, M1 interface identity information required for sending application layer data.

It should be noted that, if an M1 interface uses an IP broadcast mode for sending, the M1 interface identity information is a transport layer IP multicast address for distributing M1 interface data.

Optionally, the BMSC in the core network does not select the local MBMS functional entity in step 502 but sends the identity information of the local application server and/or to-be-broadcast area information to the MBMS GW in the core network in step 503. Therefore, step 504 further includes the MBMS GW in the core network determines, according to the identity information of the local application server and/or to-be-broadcast area information, identity information of a local MBMS functional entity configured to perform user plane data transmission.

Step 505: The MBMS GW in the core network sends a session start response message to the BMSC in the core network.

Optionally, if the identity information of the local MBMS functional entity is determined by the MBMS GW in the core network in step 504, the session start response message may further include the identity information of the local MBMS functional entity.

Step 506: The BMSC in the core network receives the session start response message.

Step 507: The BMSC in the core network returns a bearer setup response message to the local application server, where the bearer setup response message may include the destination IP address corresponding to the local MBMS bearer and the identity information of the local MBMS functional entity.

The bearer setup response message may further include the identity information of the local MBMS bearer.

Optionally, if the identity information of the local MBMS functional entity is determined by the BMSC in the core network, step 507 may also occur after step 502. The MBMS GW in the core network and the MME, and the MME and an E-UTRAN set up MBMS bearers according to an existing MBMS bearer setup message. Details are not further described herein.

Step 508: The MBMS GW in the core network sets up a connection to the local MBMS functional entity according to the identity information of the local MBMS functional entity, and sends the local MBMS bearer information to the local MBMS functional entity by using an Mx1 interface between the local MBMS functional entity and the MBMS GW in the core network.

The local MBMS bearer information may specifically include the destination IP address corresponding to the local MBMS bearer, the identity information of the local MBMS bearer, and the M1 interface identity information, and may further include QoS. In addition, the identity information of the local MBMS bearer may be specifically a TMGI and the destination IP address corresponding to the local MBMS bearer, or the destination IP address corresponding to the local MBMS bearer, or an ID of the local MBMS bearer. This is not limited.

It should be noted that, first MBMS bearer information may be sent by the BMSC in the core network to the MBMS GW in the core network, and then is sent by the MBMS GW in the core network to the local MBMS functional entity by using the Mx1 interface.

Step 509: After receiving the bearer setup response message, the application server sends the application layer data to the local MBMS functional entity by using the destination IP address corresponding to the local MBMS bearer and included in the bearer setup response message, that is, sends the application layer data by using the destination IP address corresponding to the local MBMS bearer, as the destination IP address of the application layer data.

Step 510: After receiving the application layer data sent by the local application server, the local MBMS functional entity determines local MBMS bearer information matching the application layer data.

Specifically, the local MBMS functional entity obtains an IP address of the received application layer data, and if the local MBMS bearer information includes the IP address of the application layer data, uses the local MBMS bearer information including the IP address of the application layer data, as the matched local MBMS bearer information.

Step 511: The local MBMS functional entity sends the application layer data to an E-UTRAN according to the local MBMS bearer information matching the application layer data.

Specifically, the local MBMS functional entity sends the application layer data on the M1 interface according to M1 interface identity information in the local MBMS bearer information matching the application layer data. For example, if the M1 interface identity information is the transport layer IP multicast address, obtained in step 504, for distributing the M1 interface data, an IP multicast mode is used for sending, but the E-UTRAN may receive multicast data of the M1 interface in existing mode, and send the data on an air interface to the UE in broadcast mode.

It should be noted that, the foregoing procedure in this embodiment of the present application may be further applicable to a scenario of modifying a local MBMS bearer. For example, when information about a local MBMS bearer that is already set up needs to be modified due to a reason (adjusting QoS, or adjusting the broadcast area), the foregoing procedure may be still performed. Specifically, the identity information of the local MBMS bearer carried in each message is identity information of the local MBMS bearer that is already set up, and each entity receiving the message updates or replaces the information about the local MBMS bearer that is already set up.

In this embodiment of the present application, the destination IP address corresponding to the local MBMS bearer information matching the application layer data is the destination IP address of the application layer data.

Further, when the MBMS functional entity in the core network determines that the local MBMS bearer information needs to be deleted, for example, when the MBMS functional entity in the core network determines that use of the local MBMS bearer is complete, the method further includes first, the BMSC in the core network and the MBMS GW in the core network, and the MME and the E-UTRAN delete the local MBMS bearer information according to the existing MBMS procedure, and then step 512 is performed.

Step 512: The MBMS GW in the core network sends a deletion request message for deleting local MBMS bearer information to the local MBMS functional entity, where the deletion request message may include identity information of a to-be-deleted local MBMS bearer, and the identity information of the to-be-deleted local MBMS bearer may be a TMGI.

Step 513: The local MBMS functional entity deletes, according to the identity information of the to-be-deleted local MBMS bearer, local MBMS bearer information corresponding to the identity information of the local MBMS bearer.

In this embodiment of the present application, numbers of the foregoing steps are merely examples for description of the execution process. A specific sequence of the steps is not limited in this embodiment of the present application, and some steps may be performed simultaneously or performed not according to the foregoing numbers. For example, if the identity information of the local MBMS functional entity is determined by the BMSC in the core network, step 507 may also occur after step 502, and may occur simultaneously with step 503 and step 504.

In this embodiment of the present application, the local MBMS functional entity obtains the local MBMS bearer information by using the interface between the local MBMS functional entity and the MBMS functional entity in the core network, and after receiving the application layer data sent by the local application server, the local MBMS functional entity determines the local MBMS bearer information matching the application layer data, and sends the application layer data based on the local MBMS bearer information matching the application layer data. In this embodiment of the present application, the local MBMS functional entity obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

It should be pointed out that, the method in the foregoing embodiment is also applicable to a 5G system. In the 5G system, functions performed by the BMSC and the MBMS GW in the core network, and the MME in the foregoing procedure may be implemented on a unified core network control entity, and do not need to be implemented on an interface between the BMSC and the MBMS GW, and an interface between the MME and the MBMS GW. The E-UTRAN may be an 5G access network. The function performed by the local MBMS functional entity may also be implemented by using a 5G user plane forwarding entity.

Scenario 2: An interface between a local MBMS functional entity and an MBMS functional entity in a core network is a second interface.

Figure 6:
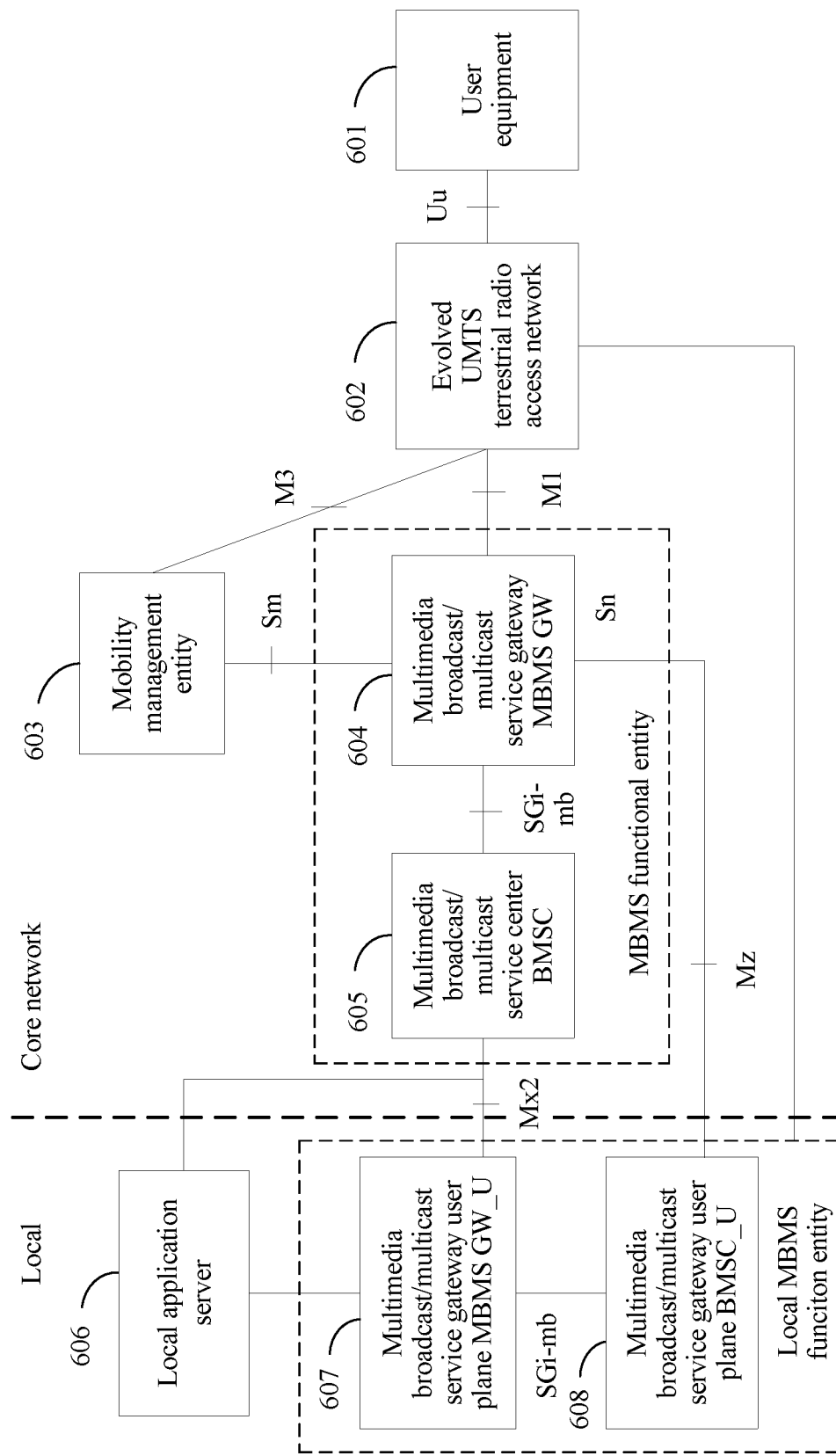
FIG. 6 is a schematic diagram of another network architecture according to an embodiment of the present application.

Based on the network architecture shown in FIG. 2, FIG. 6 illustrates a schematic diagram of a network architecture applicable to the scenario 2. As shown in FIG. 6, the network architecture includes user equipment 601, an evolved UMTS terrestrial radio access network 602, a mobility management entity 603, an MBMS GW 604 in a core network, a BMSC 605 in the core network, a local application server 606, a local MBMS GW_U 607, and a local BMSC_U 608. The MBMS GW 604 in the core network and the BMSC 605 in the core network are obtained by splitting an MBMS functional entity in the core network, the local MBMS GW_U 607 and the local BMSC_U 608 are obtained by splitting a local MBMS functional entity, the local MBMS GW_U 607 and the local BMSC_U 608 are connected by using an SGi-mb interface.

Specifically, an interface between the local MBMS functional entity and the MBMS functional entity in the core network is a second interface, and local MBMS bearer information is determined by the MBMS functional entity in the core network according to a received bearer setup request message sent by the local application server.

The local MBMS bearer information may include parameter information determined when each network element or device (for example, the MBMS GW in the core network and the BMSC in the core network) sets up a local MBMS bearer. According to different objects for determining the local MBMS bearer information, the local MBMS bearer information may be classified into first MBMS bearer information and second MBMS bearer information.

The first MBMS bearer information is determined by the BMSC in the core network according to the received bearer setup request message sent by the local application server, and is sent to the MBMS GW in the core network by using a session start request message. For example, the identity information of the local MBMS bearer is used to identify a local MBMS bearer, and may be specifically a TMGI and a destination IP address corresponding to the local MBMS bearer.

The second MBMS bearer information is determined by the MBMS GW in the core network according to the received session start request message sent by the BMSC in the core network, and optionally, is sent to the BMSC in the core network by using a session start response message, for example, M1 interface identity information, used to identify an M1 interface.

Figure 7A:
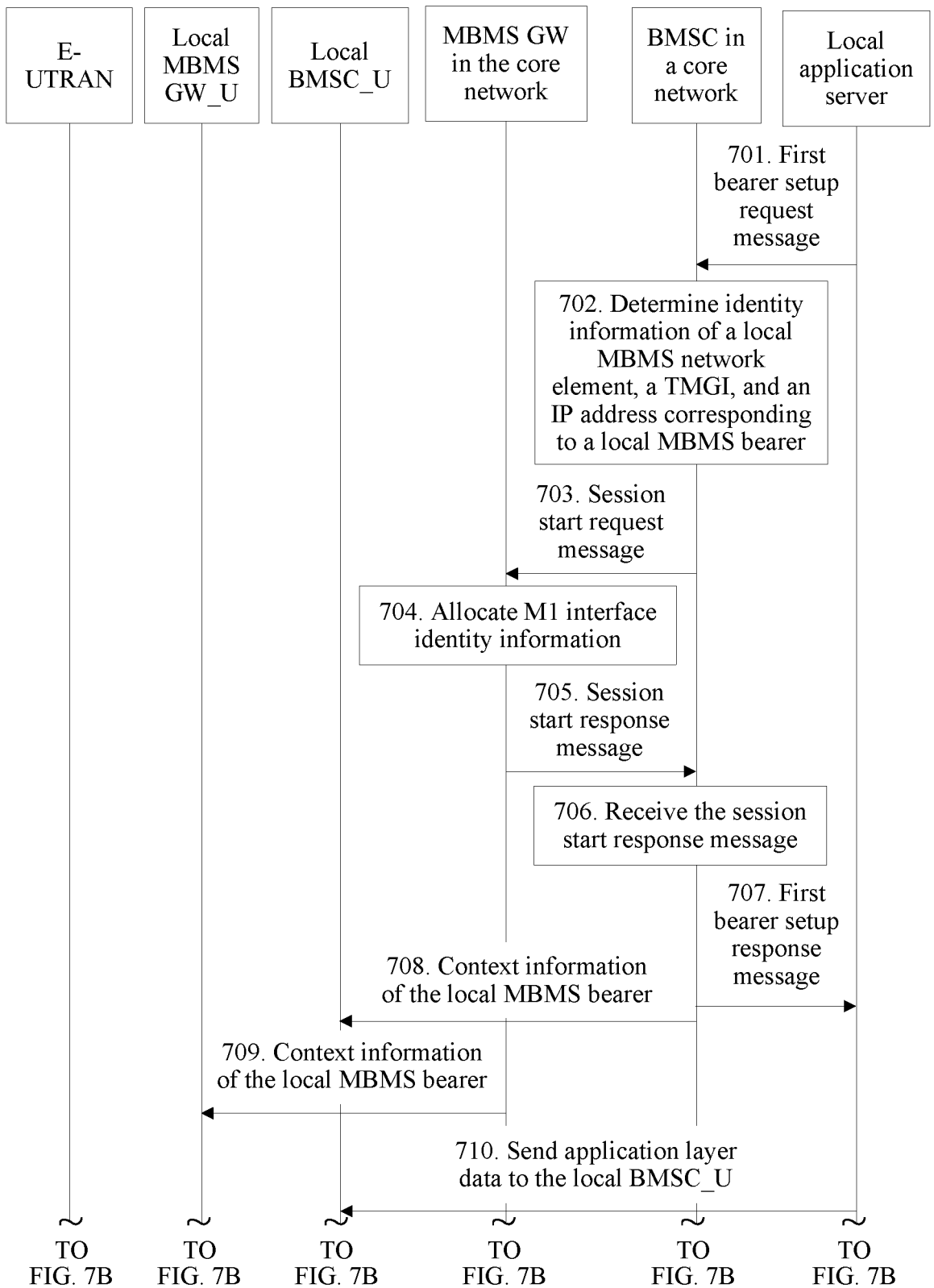
FIG. 7A and FIG. 7B are a schematic flowchart of another data transmission method according to an embodiment of the present application.
Figure 7B:
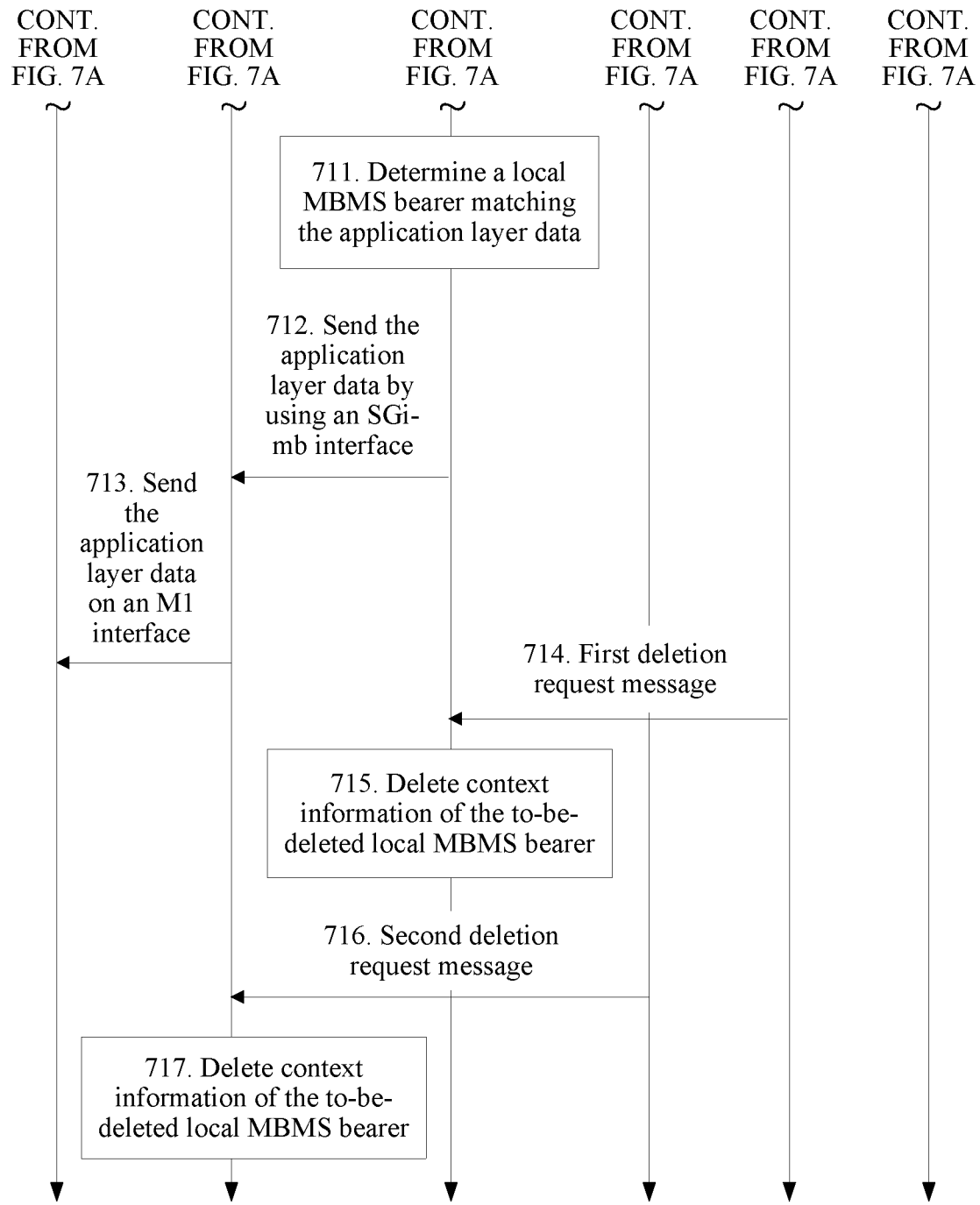

Based on the network architecture shown in FIG. 6, FIG. 7A and FIG. 7B is a schematic flowchart of a data transmission method. As shown in FIG. 7A and FIG. 7B, the method includes the following steps.

Step 701: A local application server sends a bearer setup request message to a BMSC in a core network.

Step 702: The BMSC in the core network receives the bearer setup request message, determines, according to the bearer setup request message, identity information of a local BMSC_U configured to perform user plane data transmission, and allocates, according to a service requirement in the bearer setup request message, QoS required by an MBMS bearer, identity information of a local MBMS bearer, and a tunnel identifier for sending application layer data.

The bearer setup request message may be specifically received by using an MB2-C interface.

Alternatively, the bearer setup request message carries identity information of the local application server and/or to-be-broadcast area information, and an alternative step is performed: The BMSC in the core network determines, according to the identity information of the local application server and/or the to-be-broadcast area information, identity information of a local MBMS functional entity configured to perform user plane data transmission. In other words, the alternative step may replace step 702. Obviously, after step 702, an alternative step may be further performed. This is not limited.

The identity information of the local application server may be an address of the local application server or other information used to uniquely identify the local application server. The identity information of the local BMSC_U may be address information of the local BMSC_U, or may be any identity that is mapped to an address of a network element and uniquely identifies the network element.

Optionally, in addition to determining the identity information of the local BMSC_U, the BMSC in the core network may further determine identity information of a local MBMS GW_U. The identity information of the local MBMS GW_U may be address information of the local MBMS GW_U, or may be any identity that is mapped to an address of a network element and uniquely identifies the network element.

Further, the to-be-broadcast area information may be physical location information of a to-be-broadcast area, or an identity of a cell, or may be other information that may assist the BMSC in determining a location of the to-be-broadcast area.

The identity information of the local MBMS bearer may include a TMGI and a destination IP address corresponding to the local MBMS bearer. Both the TMGI and the destination IP address corresponding to the local MBMS bearer may be determined in a plurality of manners. For details, refer to the descriptions in the embodiment shown in FIG. 5A and FIG. 5B. Details are not further described.

Step 703: The BMSC in the core network sends a session start request message to an MBMS GW in the core network.

The session start request message includes local MBMS bearer information determined in step 702, for example, the identity information of the local BMSC_U and the identity information of the local MBMS bearer.

Step 704: The MBMS GW in the core network allocates, according to the received session start request message, M1 interface identity information required for sending application layer data.

Optionally, if an M1 interface uses an IP broadcast mode for sending, the M1 interface identity information is a transport layer IP multicast address for distributing M1 interface data.

Optionally, in step 702, the BMSC in the core network may not determine the identity information of the local BMSC_U, but directly sends the identity information of the local application server and/or the to-be-broadcast area information to the MBMS GW in the core network in step 703, so that in step 704, the MBMS GW in the core network determines, according to the identity information of the local application server and/or the to-be-broadcast area information, the identity information of the local BMSC_U configured to perform user plane data transmission. Likewise, the identity information of the local MBMS GW_U may also be determined in a same manner.

Certainly, the BMSC in the core network may be responsible for determining the identity information of the local BMSC_U, but the MBMS GW is responsible for determining the identity information of the MBMS GW_U.

Step 705: The MBMS GW in the core network sends a session start response message to the BMSC in the core network, where if the identity information of the local BMSC_U and/or identity information of a local MBMS GW_U are determined by the MBMS GW in the core network in step 704, the session start response message further includes the identity information of the local BMSC_U and/or the identity information of the local MBMS GW_U.

Step 706: The BMSC in the core network receives the session start response message.

Step 707: The BMSC in the core network returns a bearer setup response message to the local application server. The bearer setup response message may include the identity information of the local BMSC_U and the identity information of the local MBMS bearer, and optionally, further include the identity information of the local MBMS GW_U.

Optionally, if the identity information of the local BMSC_U and the identity information of the local MBMS GW_U are determined by the BMSC in the core network, step 707 may also occur after step 702.

Then the MBMS GW in the core network and the MME, and the MME and an E-UTRAN set up MBMS bearers according to an existing MBMS bearer setup message. Details are not further described herein.

Step 708: The BMSC in the core network sends, by using an Mz interface between the local BMSC_U and the BMSC in the core network, the local MBMS bearer information created in step 701 to step 707 to the local BMSC_U, where the information may specifically include: QoS, a TMGI, a destination IP address corresponding to the local MBMS bearer, an SGi-mb interface data plane bearer identity, identity information of the local MBMS GW-U, and the like. If a broadcast mode is used, the SGi-mb interface data plane bearer identity is an IP broadcast address of an SGi-mb interface.

Step 709: The MBMS GW in the core network sends, by using an Mx2 interface between the local MBMS GW_U and the MBMS GW in the core network, context information of an MBMS bearer set up in step 701 to step 707 to the local MBMS GW_U, where the information may specifically include: QoS, a TMGI, a flow entry flow ID, an identity of the SGi-mb interface data plane bearer, M1 interface identity information, identity information of the local BMSC_U, and the like.

Step 710: After receiving the bearer setup response message, the application server sends the application layer data to the local BMSC_U by using the destination IP address corresponding to the local MBMS bearer and included in the bearer setup response message.

Step 711: After receiving the application layer data sent by the local application server, the local BMSC_U determines a local MBMS bearer information matching the application layer data. Specifically, the local BMSC_U obtains the IP address of the received application layer data, and if the local MBMS bearer information includes the IP address of the application layer data, the local BMSC_U uses the local MBMS bearer information including the IP address of the application layer data, as the matched local MBMS bearer information.

Step 712: The local BMSC_U sends, according to the local MBMS bearer information matching the application layer data, the application layer data in a predefined manner by using the SGi-mb interface, where if the broadcast mode is used, the predefined manner is using an IP multicast address of a predefined SGi-mb interface.

Step 713: The local MBMS GW_U receives the application layer data on the SGi-mb interface in a predefined manner, and if the SGi-mb interface uses the IP broadcast mode for sending, the local MBMS GW_U receives the application layer data according to the IP multicast address of the SGi-mb interface that is obtained in step 709.

After receiving the application layer data, the local MBMS GW_U determines the local MBMS bearer information matching the application layer data, and therefore sends the received application layer data on the M1 interface based on the matched local MBMS bearer information. For example, if the M1 interface identity information is the transport layer IP multicast address, obtained in step 704, for distributing the M1 interface data, an IP multicast mode is used for sending, but the E-UTRAN may receive multicast data of the M1 interface in existing mode, and send the multicast data to the UE on an air interface in broadcast mode.

Specifically, the local MBMS GW_U may determine, in the following two manners, the local MBMS bearer information matching the application layer data. Manner 1: The local MBMS GW_U determines, according to the IP multicast address of the SGi-mb interface for receiving the application layer data, the local MBMS bearer information including the IP multicast address of the SGi-mb interface, as the local MBMS bearer information matching the application layer data. Manner 2: The local MBMS GW_U obtains the IP address of the application layer data, and determines the local MBMS bearer information including the IP address of the application layer data, as the local MBMS bearer information matching the application layer data.

It should be noted that, the foregoing procedure in this embodiment of the present application may be further applicable to a scenario of modifying a local MBMS bearer. For example, when information about a local MBMS bearer that is already set up needs to be modified due to a reason (adjusting QoS, or adjusting the broadcast area), the foregoing procedure may be still performed. Specifically, the identity information of the local MBMS bearer carried in each message is identity information of the local MBMS bearer that is already set up, and each entity receiving the message updates or replaces the information about the local MBMS bearer that is already set up.

In this embodiment of the present application, the destination IP address corresponding to the local MBMS bearer information matching the application layer data is the destination IP address of the application layer data.

Further, when the MBMS functional entity in the core network determines that the local MBMS bearer needs to be deleted, for example, when the MBMS functional entity in the core network determines that use of the local MBMS bearer is complete, the method further includes first, the BMSC in the core network and the MBMS GW in the core network, and the MME and the E-UTRAN delete the local MBMS bearer information according to the existing MBMS procedure, and then step 714 is performed.

Step 714: The BMSC in the core network sends a first deletion request message for deleting local MBMS bearer information to the local BMSC_U by using an Mx interface, where the first deletion request message includes identity information of a to-be-deleted local MBMS bearer, and the identity information of the to-be-deleted local MBMS bearer may be a TMGI.

Step 715: The local BMSC_U deletes the local MBMS bearer information in the local BMSC_U according to the identity information of the to-be-deleted local MBMS bearer.

Step 716: The MBMS GW in the core network sends a second deletion request message for deleting local MBMS bearer information to the local MBMS GW_U by using the Mz interface, where the second deletion request message includes identity information of a to-be-deleted local MBMS bearer, and the identity information of the to-be-deleted local MBMS bearer may be a TMGI.

Step 717: The local MBMS GW_U deletes the local MBMS bearer information in the local MBMS GW_U according to the identity information of the to-be-deleted local MBMS bearer.

In this embodiment of the present application, numbers of the foregoing steps are merely examples for description of the execution process. A specific sequence of the steps is not limited in this embodiment of the present application, and some steps may be performed simultaneously or performed not according to the foregoing numbers. For example, if the identity information of the local MBMS functional entity is determined by the BMSC in the core network, step 707 may also occur after step 702, and may occur simultaneously with step 703, step 704, or the like. Step 714 and step 716 may also occur simultaneously.

In this embodiment of the present application, the local MBMS functional entity obtains the local MBMS bearer information by using the interface between the local MBMS functional entity and the MBMS functional entity in the core network, and after receiving the application layer data sent by the local application server, the local MBMS functional entity determines the local MBMS bearer information matching the application layer data, and sends the application layer data based on the local MBMS bearer information matching the application layer data. In this embodiment of the present application, the local MBMS functional entity obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

Scenario 3: An interface between a local MBMS functional entity and an MBMS functional entity in a core network is a third interface.

Figure 8:
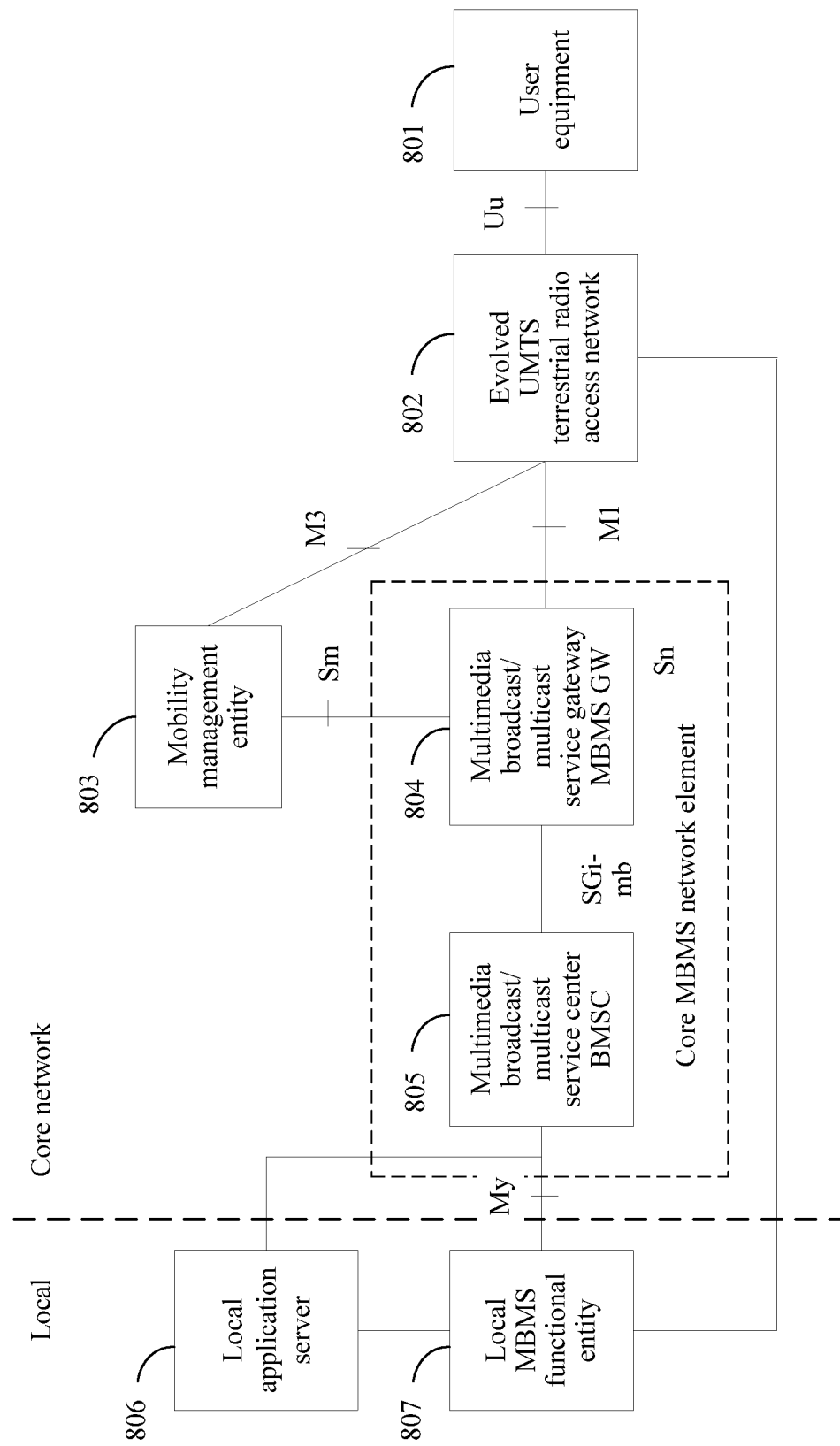
FIG. 8 is a schematic diagram of still another network architecture according to an embodiment of the present application.

Based on the network architecture shown in FIG. 2, FIG. 8 illustrates a schematic diagram of a network architecture applicable to the scenario 3. As shown in FIG. 8, the network architecture includes user equipment 801, an evolved UMTS terrestrial radio access network 802, a mobility management entity 803, an MBMS GW 804 in a core network, a BMSC 805 in the core network, a local application server 806, and a local MBMS functional entity 807. The MBMS GW 804 in the core network and the BMSC 805 in the core network are obtained by splitting an MBMS functional entity in the core network.

The MBMS functional entity in the core network is responsible for managing identity information of all MBMS bearers. Specifically, the BMSC in the core network uniformly manages MBMS bearer resources, and allocates identity information of different local MBMS bearers to a same broadcast area, to ensure that a phenomenon of identity collision does not occur in the same broadcast area.

An interface between the local MBMS functional entity and the MBMS functional entity in the core network is a third interface, and local MBMS bearer information is obtained by the local MBMS functional entity according to a received bearer setup request message sent by the local application server.

The local MBMS bearer information may include parameter information determined when each network element or device (for example, the local MBMS functional entity and the BMSC in the core network) sets up a local MBMS bearer. According to different objects for determining the local MBMS bearer information, the local MBMS bearer information may be classified into third MBMS bearer information and fourth MBMS bearer information.

The third MBMS bearer information is determined by the BMSC in the core network according to a received bearer identity request message sent by the local MBMS functional entity, and is sent to the local MBMS functional entity by using a bearer identity response message, for example, identity information of the local MBMS bearer. In this embodiment of the present application, the bearer identity request message is sent when the local MBMS functional entity determines, after receiving the bearer setup request message sent by the local application server, that the identity information of the local MBMS bearer does not exist in the local MBMS functional entity.

The fourth MBMS bearer information is determined by the local MBMS functional entity according to the received bearer setup request message sent by the local application server, for example, a QoS parameter, and M1 interface identity information.

Figure 9A:
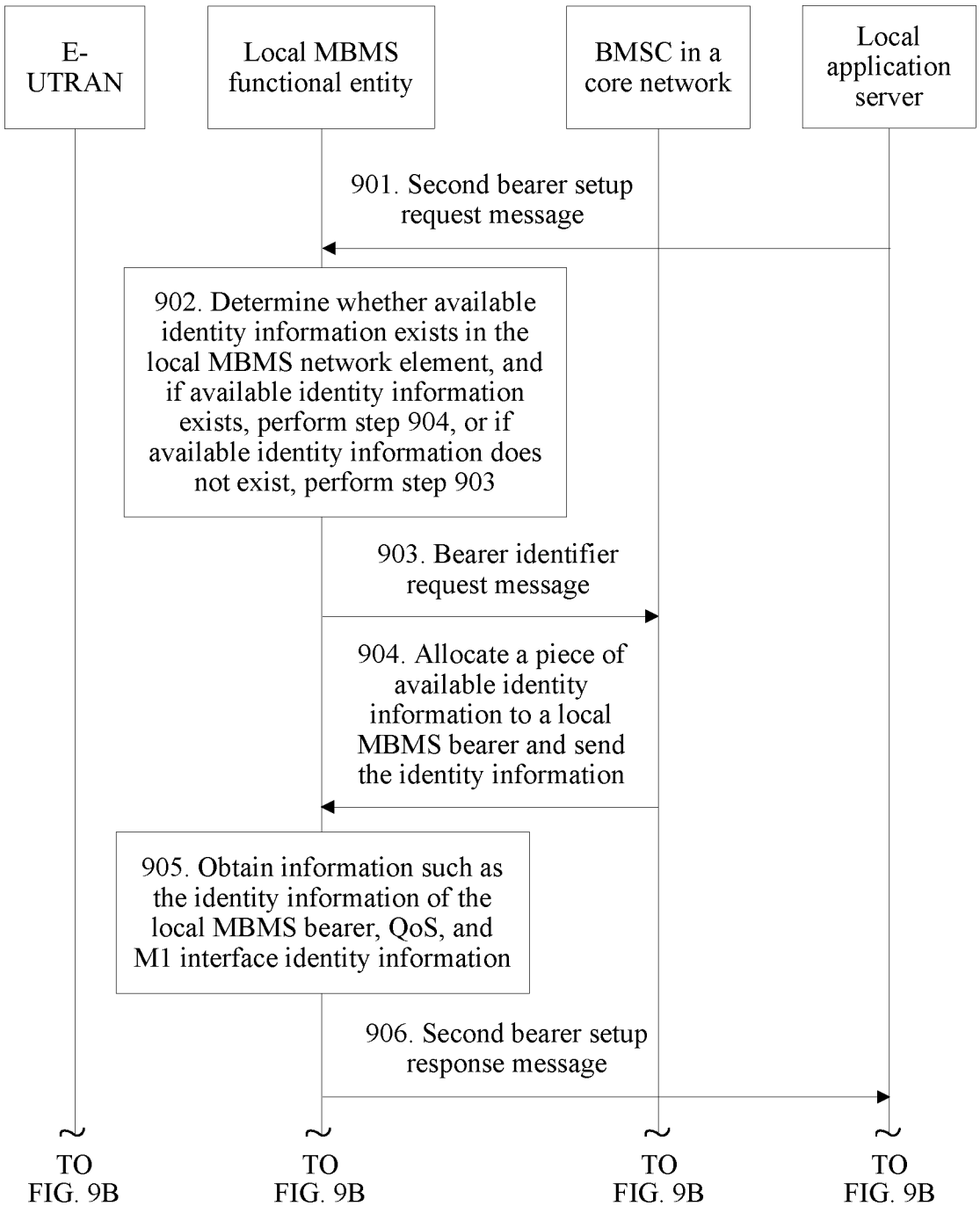
FIG. 9A and FIG. 9B are a schematic flowchart of still another data transmission method according to an embodiment of the present application.
Figure 9B:
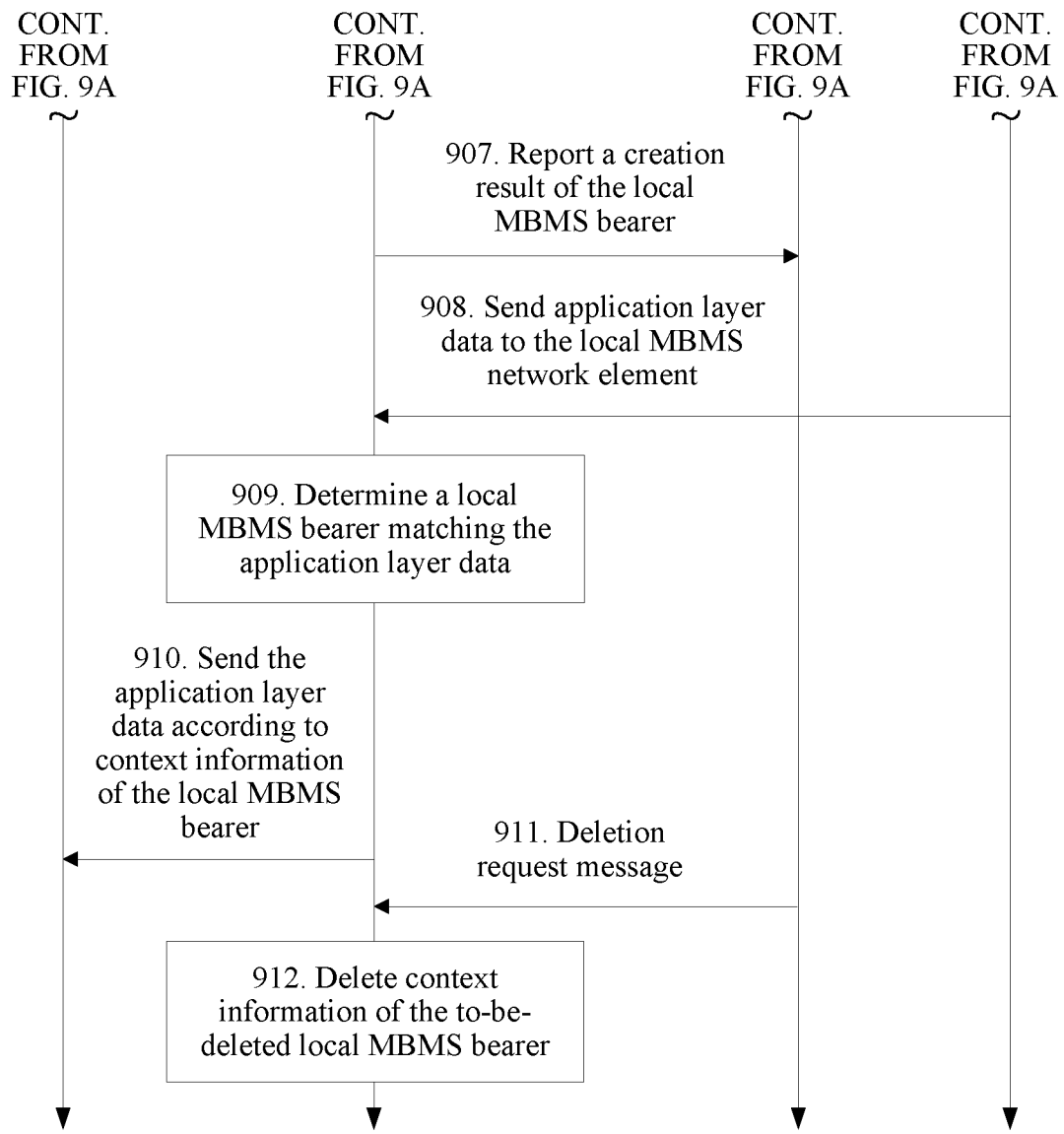

Based on the network architecture shown in FIG. 8, FIG. 9A and FIG. 9B are a schematic flowchart of still another data transmission method according to an embodiment of the present application. As shown in FIG. 9A and FIG. 9B, the method includes the following steps.

Step 901: A local application server sends a bearer setup request message to a local MBMS functional entity, where the bearer setup request message may include to-be-broadcast area information.

The to-be-broadcast area information is used to indicate a to-be-broadcast area, and may be specifically physical location information of the to-be-broadcast area, or an identity of a cell, or may be other information that may assist a BMSC in determining a location of the to-be-broadcast area.

Step 902: The local MBMS functional entity receives the bearer setup request message by using an MB2-U interface, and may directly perform step 903, or may first determine whether available identity information exists in the local MBMS functional entity, and if available identity information exists, determine the available identity information as identity information of a local MBMS bearer, and perform step 904, or if available identity information does not exist, perform step 903. Further, when determining whether available identity information exists, the local MBMS functional entity may determine, according to the to-be-broadcast area information carried in the bearer setup request message, whether matched identity information exists.

Step 903: The local MBMS functional entity sends a bearer identity request message to a BMSC in a core network by using an MBy interface, where the bearer identity request message may include the to-be-broadcast area information.

Step 904: After receiving the bearer identity request message, the BMSC in the core network may allocate a piece of available identity information (which may include a TMGI and a destination IP address corresponding to the local MBMS bearer) to the local MBMS bearer according to a requirement, and send the identity information to the local MBMS functional entity by using a bearer identity response message.

Further, the BMSC in the core network may select, according to the to-be-broadcast area information carried in the bearer identity request message and a correspondence between the allocated identity information of the local MBMS bearer and the to-be-broadcast area information, identity information that is not allocated in a related broadcast area. Specifically, the BMSC in the core network may store a correspondence between the allocated identity information of the local MBMS bearer and broadcast area information, where the identity information of the local MBMS bearer may be a TMGI. The correspondence between the allocated identity information of the local MBMS bearer and the broadcast area information may be stored in a form of a data table, as shown in Table 1.

TABLE 1

Correspondence between an allocated
TMGI and broadcast area information

| Broadcast area information | Allocated TMGI |
|---|---|
| Broadcast area 1 | ******x |
|  | ******y |
|  | ... |
| Broadcast area 2 | ******p |
|  | ******q |
|  | ... |
| ... | ... |
|  | ... |
|  | ... |

For example, if the to-be-broadcast area information in the bearer identity request message received by the BMSC in the core network is a broadcast area 1, the BMSC in the core network allocates an available TMGI to a current local MBMS bearer after obtaining a TMGI that is already allocated to the broadcast area 1 from a table (that is, Table 1) of a correspondence between an allocated TMGI and broadcast area information, where the TMGI is different from the TMGI (such as ****x, or ****y) that is already allocated to the broadcast area 1.

In this embodiment of the present application, the BMSC in the core network may update Table 1 according to a status of a local MBMS bearer created by the local MBMS functional entity, for example, update content in Table 1 when the BMSC in the core network receives a message reported by the local MBMS functional entity and indicating that identity information of the local MBMS bearer and corresponding broadcast area information are already created successfully.

Step 905: The local MBMS functional entity allocates QoS, M1 interface identity information, and the like after obtaining the identity information of the local MBMS bearer, and if an M1 interface uses an IP broadcast mode for sending, the M1 interface identity information is a transport layer IP multicast address for distributing M1 interface data.

Then the local MBMS functional entity, the MME, and an E-UTRAN set up MBMS bearers according to an existing MBMS bearer setup message. Details are not further described herein.

Step 906: The local MBMS functional entity sends a bearer setup response message to the local application server, where the bearer setup response message includes obtained local MBMS bearer information, and may specifically include the identity information of the local MBMS bearer, a QoS parameter, and the like.

Step 907: Optionally, the local MBMS functional entity reports a creation result of the local MBMS bearer to the BMSC in the core network, if the foregoing procedure is performed successfully, the local MBMS bearer is created successfully, and a message reported by the local MBMS functional entity to the BMSC in the core network and indicating the creation result of the local MBMS bearer includes the identity information of the local MBMS bearer and corresponding to-be-broadcast area information, so that the BMSC in the core network updates the content in Table 1 according to the received creation message, or if the local MBMS bearer fails to be created, the BMSC in the core network may not update the content in Table 1.

Optionally, in this embodiment of the present application, the local MBMS functional entity may actively report the creation result of the local MBMS bearer to the BMSC in the core network after determining the creation result of the local MBMS bearer, or the local MBMS functional entity may report the creation result of the local MBMS bearer to the BMSC in the core network after receiving a query request message sent by the BMSC in the core network. The BMSC in the core network may periodically send a query request message, where the query request message includes identity information of the local MBMS bearer that is just allocated. After receiving the query request message, the local MBMS functional entity obtains the creation result of the local MBMS bearer according to the identity information of the local MBMS bearer in the query request message, and sends the creation result to the BMSC in the core network by using a query response message. After receiving the query response message, the BMSC in the core network stops sending the query request message, and performs a corresponding operation according to the query response message, for example, updates Table 1.

In this embodiment of the present application, step 907 is optional, and the BMSC in the core network may also actively update Table 1 according to a specified period. This is not specifically limited in this embodiment of the present application.

Step 908: After receiving the bearer setup response message, the application server sends application layer data to the local MBMS functional entity by using the destination IP address corresponding to the local MBMS bearer and included in the bearer setup response message.

Step 909: After receiving the application layer data sent by the local application server, the local MBMS functional entity determines local MBMS bearer information matching the application layer data. Specifically, the local MBMS functional entity obtains an IP address of the received application layer data, and if the local MBMS bearer information includes the IP address of the application layer data, the local MBMS functional entity uses the local MBMS bearer information including the IP address of the application layer data, as the matched local MBMS bearer information.

Step 910: The local MBMS functional entity sends the application layer data to an E-UTRAN according to the local MBMS bearer information matching the application layer data. Specifically, the local MBMS functional entity sends the application layer data on the M1 interface according to M1 interface identity information in the local MBMS bearer information matching the application layer data. For example, if the M1 interface identity information is the transport layer IP multicast address, obtained in step 904, for distributing the M1 interface data, an IP multicast mode is used for sending, but the E-UTRAN may receive multicast data of the M1 interface in existing mode, and send the data on the air interface to the UE in broadcast mode.

It should be noted that, the foregoing procedure in this embodiment of the present application may be further applicable to a scenario of modifying a local MBMS bearer. For example, when information about a local MBMS bearer that is already set up needs to be modified due to a reason (adjusting QoS, or adjusting the broadcast area), the foregoing procedure may be still performed. Specifically, the identity information of the local MBMS bearer carried in each message is identity information of the local MBMS bearer that is already set up, and each entity receiving the message updates or replaces the information about the local MBMS bearer that is already set up.

In this embodiment of the present application, the destination IP address corresponding to the local MBMS bearer information matching the application layer data is the destination IP address of the application layer data.

Further, when the MBMS functional entity in the core network determines that the local MBMS bearer needs to be deleted, for example, when the MBMS functional entity in the core network determines that the identity information of the local MBMS bearer (when TMGI resources are insufficient) needs to be deleted, or a local MBMS service is terminated, the method further includes the following steps.

Step 911: Optionally, if the MBMS functional entity in the core network determines that the identity information of the local MBMS bearer needs to be deleted, the BMSC in the core network sends a deletion request message to the local MBMS functional entity, where the deletion request message includes identity information of a to-be-deleted local MBMS bearer, and the identity information of the to-be-deleted local MBMS bearer may be a TMGI.

Step 912: The local MBMS functional entity deletes, according to the identity information of the to-be-deleted local MBMS bearer, local MBMS bearer information corresponding to the identity information of the local MBMS bearer.

Further, the local MBMS functional entity may report a deletion result to the BMSC in the core network after deleting the local MBMS bearer information, so that the BMSC in the core network updates the content in Table 1 according to the deletion result. For example, if the identity information of the to-be-deleted local MBMS bearer is a TMGI in the broadcast area 1, the BMSC in the core network may delete, after receiving a deletion success result sent by the local MBMS functional entity, the TMGI from the allocated TMGI corresponding to the broadcast area 1.

The foregoing step of deleting the local MBMS bearer information may also be initiated by the local MBMS functional entity. For example, when the local MBMS functional entity determines that the local MBMS service is terminated, the local MBMS functional entity may directly report the deletion result to the BMSC in the core network after deleting the local MBMS bearer information, so that the BMSC in the core network updates the content in Table 1 according to the deletion result.

In this embodiment of the present application, numbers of the foregoing steps are merely examples for description of the execution process. A specific sequence of the steps is not limited in this embodiment of the present application, and some steps may be performed simultaneously or performed not according to the foregoing numbers.

In this embodiment of the present application, the local MBMS functional entity obtains the local MBMS bearer information by using the interface between the local MBMS functional entity and the MBMS functional entity in the core network, and after receiving the application layer data sent by the local application server, the local MBMS functional entity determines the local MBMS bearer information matching the application layer data, and sends the application layer data based on the local MBMS bearer information matching the application layer data. In this embodiment of the present application, the local MBMS functional entity obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

It should be pointed out that, the method in the foregoing embodiment is also applicable to a 5G system. Specifically, in the 5G system, functions performed by the MBMS functional entity in the core network and the MME in the foregoing procedure may be implemented on a unified core network control entity. The E-UTRAN may be an access network device for 5G access.

For the foregoing method procedure, an embodiment of the present application further provides a local MBMS functional entity and a core MBMS network element. For specific content about the local MBMS functional entity and the core MBMS network element, refer to the foregoing implementation method.

Figure 10:
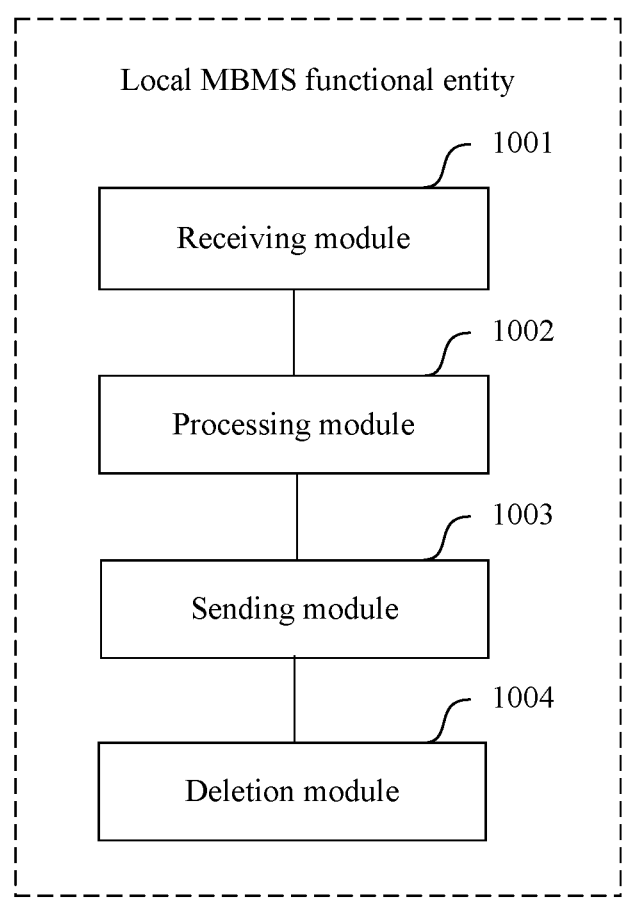
FIG. 10 is a schematic structural diagram of a local MBMS functional entity according to an embodiment of the present application.

FIG. 10 is a schematic structural diagram of a local MBMS functional entity according to an embodiment of the present application. The local MBMS functional entity is configured to perform the foregoing method procedure, and as shown in FIG. 10, includes a receiving module 1001, configured to obtain local MBMS bearer information, and receive application layer data sent by a local application server, a processing module 1002, configured to determine, based on the obtained local MBMS bearer information, local MBMS bearer information matching the application layer data, and a sending module 1003, configured to send the application layer data based on the matched local MBMS bearer information.

Optionally, the receiving module 1001 is further configured to obtain a destination IP address of the application layer data, and the processing module 1002 is specifically configured to use the local MBMS bearer information including the destination IP address of the application layer data, as the matched local MBMS bearer information if the local MBMS bearer information includes the destination IP address of the application layer data.

Optionally, an MBMS functional entity in a core network includes a broadcast/multicast service center BMSC in the core network and a multimedia broadcast/multicast service gateway MBMS GW in the core network, and the receiving module 1001 is specifically configured to receive, by using an Mx1 interface between the local MBMS functional entity and the MBMS GW in the core network, the local MBMS bearer information sent by the MBMS GW in the core network.

Optionally, an MBMS functional entity in a core network includes a BMSC in the core network and an MBMS GW in the core network, the local MBMS functional entity includes a local broadcast/multicast service center user plane BMSC_U and a local multimedia broadcast/multicast service gateway user plane MBMS GW_U, the local MBMS bearer information includes first MBMS bearer information and second MBMS bearer information, and the receiving module 1001 includes a receiving module in the local BMSC_U and a receiving module in the local MBMS GW_U, where the receiving module in the local BMSC_U is specifically configured to receive the first MBMS bearer information by using an Mz interface between the local BMSC_U and the BMSC in the core network, and the receiving module in the local MBMS GW_U is specifically configured to receive the first MBMS bearer information and the second MBMS bearer information by using an Mx2 interface between the local MBMS GW_U and the MBMS GW in the core network.

Optionally, an MBMS functional entity in a core network includes a BMSC in the core network and an MBMS GW in the core network, and the local MBMS bearer information includes third MBMS bearer information and fourth MBMS bearer information, the receiving module 1001 is further configured to receive a bearer setup request message sent by the local application server, the sending module 1003 is further configured to send a bearer identity request message to the BMSC in the core network after the receiving module receives the bearer setup request message, the receiving module 1001 is specifically configured to: after the sending module sends the bearer identity request message, receive, by using an My interface between the local MBMS functional entity and the BMSC in the core network, the third MBMS bearer information sent by the BMSC in the core network, and the processing module 1002 is further configured to determine the fourth MBMS bearer information according to the bearer setup request message.

Optionally, the local MBMS bearer information includes a destination IP address corresponding to a local MBMS bearer, and the sending module 1003 is further configured to send the destination IP address corresponding to the local MBMS bearer to the local application server by using a bearer setup response message.

Optionally, the local MBMS functional entity further includes a deletion module 1004, configured to delete the matched local MBMS bearer information.

Optionally, the receiving module 1001 is further configured to receive deletion request message sent by the MBMS functional entity in the core network and used for requesting to delete the matched local MBMS bearer information, and the deletion module 1004 is specifically configured to delete the matched local MBMS bearer information according to the deletion request message.

Optionally, if the local MBMS functional entity includes the local BMSC_U and the local MBMS GW_U, the deletion request message includes a first deletion request message and a second deletion request message, and the deletion module includes a deletion module in the local BMSC_U and a deletion module in the local MBMS GW_U, where the deletion module in the local BMSC_U is specifically configured to delete local MBMS bearer information in the local BMSC_U according to the first deletion request message, and the deletion module in the local MBMS GW_U is specifically configured to delete local MBMS bearer information in the local MBMS GW_U according to the second deletion request message.

In this embodiment of the present application, the local MBMS functional entity obtains the local MBMS bearer information by using the interface between the local MBMS functional entity and the MBMS functional entity in the core network, and after receiving the application layer data sent by a local application server, the local MBMS functional entity determines the local MBMS bearer information matching the application layer data, and sends the application layer data based on the local MBMS bearer information matching the application layer data. In this embodiment of the present application, the local MBMS functional entity first obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

Figure 11:
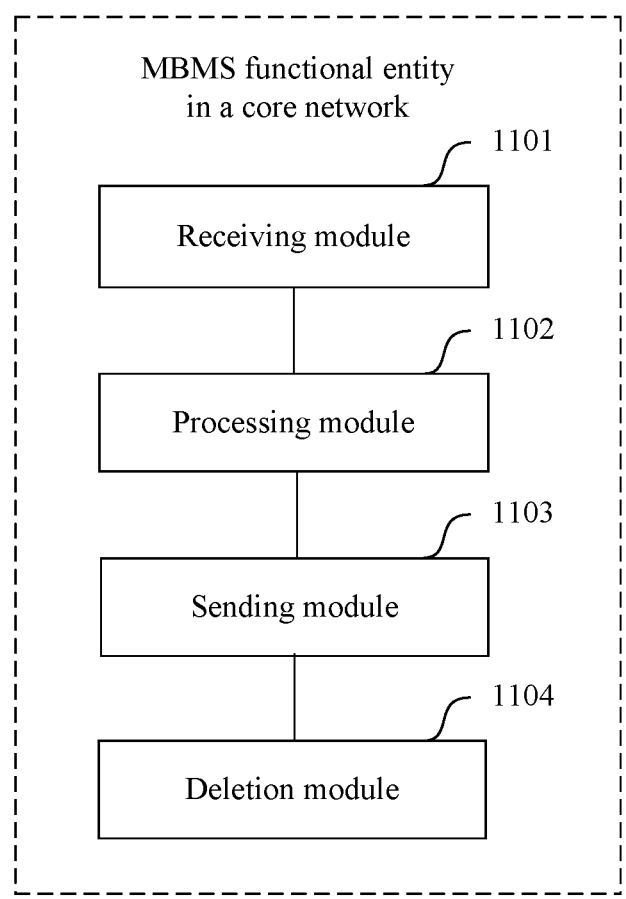
FIG. 11 is a schematic structural diagram of an MBMS functional entity in a core network according to an embodiment of the present application.

FIG. 11 is a schematic structural diagram of an MBMS functional entity in a core network according to an embodiment of the present application. The MBMS functional entity in the core network is configured to perform the foregoing method procedure.

An embodiment of the present application provides an MBMS functional entity in a core network, where the MBMS functional entity in the core network includes a receiving module 1101, configured to receive a bearer request message, a processing module 1102, configured to determine local MBMS bearer information according to the bearer request message, and a sending module 1103, configured to send the determined local MBMS bearer information to a local MBMS functional entity.

Optionally, the bearer request message is a bearer setup request message sent by a local application server, and the sending module 1103 is further configured to send a bearer setup response message to the local application server.

Optionally, the local MBMS bearer information includes a destination IP address corresponding to a local MBMS bearer, and the bearer setup response message includes the destination IP address corresponding to the local MBMS bearer.

Optionally, the bearer setup request message includes identity information of the local application server and/or to-be-broadcast area information, and the processing module 1102 is further configured to determine identity information of the local MBMS functional entity according to the identity information of the local application server and/or the to-be-broadcast area information, and send, by using the sending module 1103, the identity information of the local MBMS functional entity to the local application server by using the bearer setup response message, or if the local MBMS functional entity includes a local multimedia broadcast/multicast service gateway user plane MBMS GW_U and a local broadcast/multicast service center user plane BMSC_U, determine identity information of the local BMSC_U and identity information of the local MBMS GW_U according to the identity information of the local application server and/or the to-be-broadcast area information, and send, by using the sending module 1103, the identity information of the local BMSC_U to the local application server by using the bearer setup response message.

Optionally, the MBMS functional entity in the core network includes a broadcast/multicast service center BMSC in the core network and a multimedia broadcast/multicast service gateway MBMS GW in the core network, and the processing module 1102 includes a processing module in the BMSC in the core network and a processing module in the MBMS GW in the core network, where the processing module in the BMSC in the core network is configured to determine the identity information of the local BMSC_U and the identity information of the local MBMS GW_U according to the identity information of the local application server and/or the to-be-broadcast area information, or the processing module in the BMSC in the core network is configured to determine the identity information of the local BMSC_U according to the identity information of the local application server and/or the to-be-broadcast area information, and the processing module in the MBMS GW in the core network is configured to determine the identity information of the local MBMS GW_U according to the identity information of the local application server and/or the to-be-broadcast area information, or the processing module in the MBMS GW in the core network is configured to determine the identity information of the local BMSC_U and the identity information of the local MBMS GW_U according to the identity information of the local application server and/or the to-be-broadcast area information.

Optionally, the MBMS functional entity in the core network includes the BMSC in the core network and the MBMS GW in the core network, the local MBMS bearer information includes first MBMS bearer information and second MBMS bearer information, the processing module 1102 includes the processing module in the BMSC in the core network and the processing module in the MBMS GW in the core network, and the sending module 1103 includes a sending module in the BMSC in the core network and a sending module in the MBMS GW in the core network, where the processing module in the BMSC in the core network determines the first MBMS bearer information according to the bearer setup request message sent by the local application server, the sending module in the BMSC in the core network is further configured to send a session start request message to the MBMS GW in the core network, where the session start request message includes the first MBMS bearer information, and the processing module in the MBMS GW in the core network determines the second MBMS bearer information according to the session start request message.

Optionally, the first MBMS bearer information further includes the destination IP address corresponding to the local MBMS bearer.

Optionally, the session start request message further includes the identity information of the local MBMS GW_U determined by the BMSC in the core network or the identity information of the local MBMS functional entity. Optionally, the sending module in the MBMS GW in the core network is specifically configured to send the determined first MBMS bearer information and second MBMS bearer information to the local MBMS functional entity by using an Mx1 interface between the BMSC in the core network and the local MBMS functional entity.

Optionally, the local MBMS functional entity includes the local MBMS GW_U and the local BMSC_U, the sending module in the BMSC in the core network sends the first MBMS bearer information to the local BMSC_U by using an Mz interface between the local BMSC_U and the BMSC in the core network, and the sending module in the MBMS GW in the core network sends the first MBMS bearer information and the second MBMS bearer information to the local MBMS GW_U by using an Mx2 interface between the local MBMS GW_U and the MBMS GW in the core network.

Optionally, the local MBMS bearer information includes identity information of a local MBMS bearer, and the bearer request message is a bearer identity request message sent by the local MBMS functional entity, the processing module 1102 is specifically configured to determine the identity information of the local MBMS bearer according to the bearer identity request message sent by the local MBMS functional entity, and the sending module 1103 is specifically configured to send the identity information of the local MBMS bearer to the local MBMS functional entity.

Optionally, the bearer identity request message includes to-be-broadcast area information, and the processing module 1102 is specifically configured to determine the identity information of the local MBMS bearer according to the to-be-broadcast area information.

Optionally, the MBMS functional entity in the core network includes a BMSC in the core network and an MBMS GW in the core network, and the sending module 1103 includes a sending module in the BMSC in the core network and a sending module in the MBMS GW in the core network, where the sending module in the BMSC in the core network sends the identity information of the local MBMS bearer to the local MBMS functional entity by using an My interface between the local MBMS functional entity and the BMSC in the core network.

Optionally, the MBMS functional entity in the core network further includes a deletion module 1104, configured to determine to delete the local MBMS bearer information, and the sending module 1103 is further configured to send, to the local MBMS functional entity, deletion request message for deleting the local MBMS bearer information.

Optionally, the local MBMS functional entity includes the local MBMS GW_U and the local BMSC_U, the MBMS functional entity in the core network includes the BMSC in the core network and the MBMS GW in the core network, and the deletion request message includes a first deletion request message and a second deletion request message, and the sending module 1103 includes the sending module in the BMSC in the core network and the sending module in the MBMS GW in the core network, where the sending module in the BMSC in the core network sends the first deletion request message to the local BMSC_U by using the Mz interface between the local BMSC_U and the BMSC in the core network, and the sending module in the MBMS GW in the core network sends the second deletion request message to the local MBMS GW_U by using the Mx2 interface between the local MBMS GW_U and the MBMS GW in the core network.

In this embodiment of the present application, the local MBMS functional entity obtains the local MBMS bearer information by using the interface between the local MBMS functional entity and the MBMS functional entity in the core network, and after receiving the application layer data sent by the local application server, the local MBMS functional entity determines the local MBMS bearer information matching the application layer data, and sends the application layer data based on the local MBMS bearer information matching the application layer data. In this embodiment of the present application, the local MBMS functional entity first obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

Figure 12:
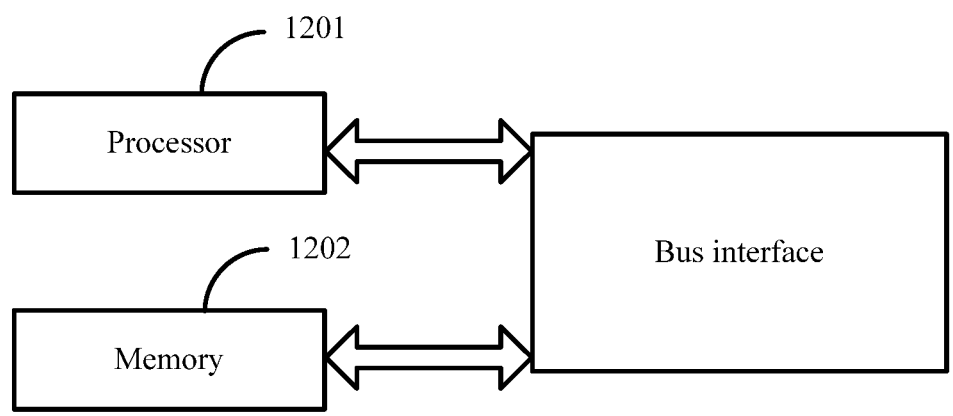
FIG. 12 is a schematic structural diagram of another local MBMS functional entity according to an embodiment of the present application.

Based on a same conception, FIG. 12 is a schematic structural diagram of another local MBMS functional entity according to an embodiment of the present application. The local MBMS functional entity includes a processor 1201 and a memory 1202.

The processor 1201 is configured to: obtain local MBMS bearer information, receive application layer data sent by a local application server, determine, based on the obtained local MBMS bearer information, local MBMS bearer information matching the application layer data, and send the application layer data based on the matched local MBMS bearer information.

The memory 1202 may store data used when the processor performs an operation. The memory 1202 may include a volatile memory, for example, a random access memory (RAM). The memory 1202 may also include a non-volatile memory, for example, a read-only memory (ROM), a flash memory, a hard disk drive (HDD), or a solid-state drive (SSD). The memory 1202 may further include a combination of the foregoing types of memories.

Optionally, the processor 1201 is further configured to: obtain a destination IP address of the application layer data, and use the local MBMS bearer information including the destination IP address of the application layer data, as the matched local MBMS bearer information if the local MBMS bearer information includes the destination IP address of the application layer data.

Optionally, an MBMS functional entity in a core network includes a broadcast/multicast service center BMSC in the core network and a multimedia broadcast/multicast service gateway MBMS GW in the core network, and the processor 1201 is specifically configured to receive, by using an Mx1 interface between the local MBMS functional entity and the MBMS GW in the core network, the local MBMS bearer information sent by the MBMS GW in the core network.

Optionally, an MBMS functional entity in a core network includes a BMSC in the core network and an MBMS GW in the core network, the local MBMS functional entity includes a local broadcast/multicast service center user plane BMSC_U and a local multimedia broadcast/multicast service gateway user plane MBMS GW_U, the local MBMS bearer information includes first MBMS bearer information and second MBMS bearer information, and the processor includes a processor in the local BMSC_U and a processor in the local MBMS GW_U, where the processor in the local BMSC_U is specifically configured to receive the first MBMS bearer information by using an Mz interface between the local BMSC_U and the BMSC in the core network, and the processor in the local MBMS GW_U is specifically configured to receive the first MBMS bearer information and the second MBMS bearer information by using an Mx2 interface between the local MBMS GW_U and the MBMS GW in the core network.

Optionally, an MBMS functional entity in a core network includes a BMSC in the core network and an MBMS GW in the core network, and the local MBMS bearer information includes third MBMS bearer information and fourth MBMS bearer information, the processor 1201 is configured to: receive a bearer setup request message sent by the local application server, send a bearer identity request message to the BMSC in the core network, and receive, by using an My interface between the local MBMS functional entity and the BMSC in the core network, the third MBMS bearer information sent by the BMSC in the core network, and the processor is further configured to determine the fourth MBMS bearer information according to the bearer setup request message.

Optionally, the local MBMS bearer information includes a destination IP address corresponding to a local MBMS bearer, and the processor 1201 is further configured to send the destination IP address corresponding to the local MBMS bearer to the local application server by using a bearer setup response message.

Optionally, the processor 1201 is further configured to delete the matched local MBMS bearer information.

Optionally, the processor 1201 is specifically configured to receive deletion request message sent by the MBMS functional entity in the core network and used for requesting to delete the matched local MBMS bearer information, and delete the matched local MBMS bearer information according to the deletion request message.

Optionally, if the local MBMS functional entity includes the local BMSC_U and the local MBMS GW_U, the deletion request message includes a first deletion request message and a second deletion request message, and the processor includes a processor in the local BMSC_U and a processor in the local MBMS GW_U, where the processor in the local BMSC_U is specifically configured to delete local MBMS bearer information in the local BMSC_U according to the first deletion request message, and the processor in the local MBMS GW_U is specifically config- ured to delete local MBMS bearer information in the local MBMS GW_U according to the second deletion request message. A bus architecture may include any quantity of interconnect buses and bridges, specifically for interconnecting various circuits of one or more processors and a memory. The bus architecture may further interconnect various other circuits such as a peripheral device, a voltage regulator, and a power management circuit. These are all well known in the art, and therefore are not further described in the specification. A bus interface provides an interface. The processor is responsible for managing the bus architecture and general processing.

Figure 13:
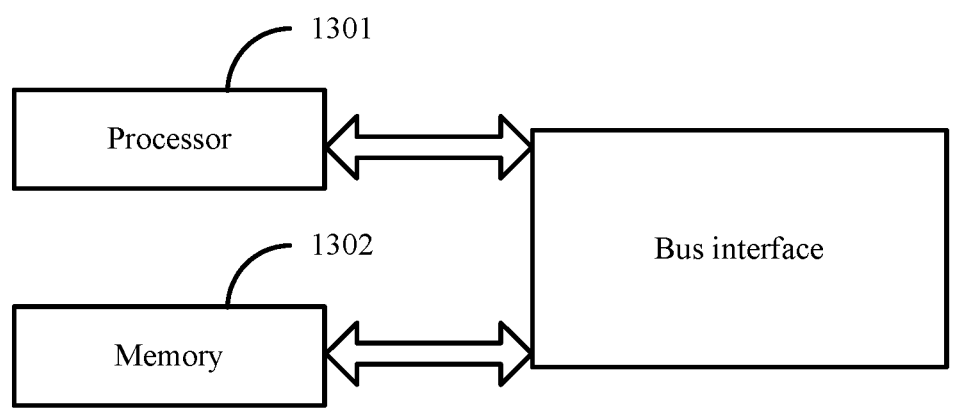
FIG. 13 is a schematic structural diagram of another MBMS functional entity in a core network according to an embodiment of the present application.

Based on a same conception, FIG. 13 is a schematic structural diagram of another MBMS functional entity in a core network according to an embodiment of the present application. The MBMS functional entity in the core network is configured to perform the foregoing method procedure, and includes a processor 1301 and a memory 1302.

The processor 1301 is configured to: receive a bearer request message, determine local MBMS bearer information according to the bearer request message, and send the determined local MBMS bearer information to a local MBMS functional entity.

The memory 1302 may store data used when the processor performs an operation. The memory 1302 may include a volatile memory, for example, an RAM. The memory 1302 may also include a non-volatile memory, for example, an ROM, a flash memory, an HDD, or an SSD. The memory 1302 may further include a combination of the foregoing types of memories.

Optionally, the bearer request message is a bearer setup request message sent by a local application server, and the processor 1301 is further configured to send a bearer setup response message to the local application server.

Optionally, the local MBMS bearer information includes a destination IP address corresponding to a local MBMS bearer, and the bearer setup response message includes the destination IP address corresponding to the local MBMS bearer.

Optionally, the bearer setup request message includes identity information of the local application server and/or to-be-broadcast area information, and the processor 1301 is further configured to determine identity information of the local MBMS functional entity according to the identity information of the local application server and/or the to-be-broadcast area information, and send the identity information of the local MBMS functional entity to the local application server by using the bearer setup response message, or if the local MBMS functional entity includes a local multimedia broadcast/multicast service gateway user plane MBMS GW_U and a local broadcast/multicast service center user plane BMSC_U, determine identity information of the local BMSC_U and identity information of the local MBMS GW_U according to the identity information of the local application server and/or the to-be-broadcast area information, and send the identity information of the local BMSC_U to the local application server by using the bearer setup response message.

Optionally, the MBMS functional entity in the core network includes a broadcast/multicast service center BMSC in the core network and a multimedia broadcast/multicast service gateway MBMS GW in the core network, and the processor 1301 includes a processor in the BMSC in the core network and a processor in the MBMS GW in the core network, where the processor in the BMSC in the core network is configured to determine the identity information of the local BMSC_U and the identity information of the local MBMS GW_U according to the identity information of the local application server and/or the to-be-broadcast area information, or the processor in the BMSC in the core network is configured to determine the identity information of the local BMSC_U according to the identity information of the local application server and/or the to-be-broadcast area information, and the processor in the MBMS GW in the core network is configured to determine the identity information of the local MBMS GW_U according to the identity information of the local application server and/or the to-be-broadcast area information, or the processor in the MBMS GW in the core network is configured to determine the identity information of the local BMSC_U and the identity information of the local MBMS GW_U according to the identity information of the local application server and/or the to-be-broadcast area information.

Optionally, the MBMS functional entity in the core network includes the BMSC in the core network and the MBMS GW in the core network, the local MBMS bearer information includes first MBMS bearer information and second MBMS bearer information, and the processor 1301 includes the processor in the BMSC in the core network and the processor in the MBMS GW in the core network, where the processor in the BMSC in the core network determines the first MBMS bearer information according to the bearer setup request message sent by the local application server, and sends a session start request message to the MBMS GW in the core network, where the session start request message includes the first MBMS bearer information, and the processor in the MBMS GW in the core network determines the second MBMS bearer information according to the session start request message.

Optionally, the first MBMS bearer information further includes the destination IP address corresponding to the local MBMS bearer.

Optionally, the session start request message further includes the identity information of the local MBMS GW_U determined by the BMSC in the core network or the identity information of the local MBMS functional entity. Optionally, the processor in the MBMS GW in the core network is specifically configured to send the determined first MBMS bearer information and second MBMS bearer information to the local MBMS functional entity by using an Mx1 interface between the BMSC in the core network and the local MBMS functional entity.

Optionally, the local MBMS functional entity includes the local MBMS GW_U and the local BMSC_U, the processor in the BMSC in the core network sends the first MBMS bearer information to the local BMSC_U by using an Mz interface between the local BMSC_U and the BMSC in the core network, and the processor in the MBMS GW in the core network sends the first MBMS bearer information and the second MBMS bearer information to the local MBMS GW_U by using an Mx2 interface between the local MBMS GW_U and the MBMS GW in the core network.

Optionally, the local MBMS bearer information includes identity information of a local MBMS bearer, and the bearer request message is a bearer identity request message sent by the local MBMS functional entity, and the processor 1301 is specifically configured to determine the identity information of the local MBMS bearer according to the bearer identity request message sent by the local MBMS functional entity, and send the identity information of the local MBMS bearer to the local MBMS functional entity.

Optionally, the bearer identity request message includes to-be-broadcast area information, and the processor 1301 is specifically configured to determine the identity information of the local MBMS bearer according to the to-be-broadcast area information.

Optionally, the MBMS functional entity in the core network includes a BMSC in the core network and an MBMS GW in the core network, and the processor includes a processor in the BMSC in the core network and a processor in the MBMS GW in the core network, where the processor in the BMSC in the core network sends the identity information of the local MBMS bearer to the local MBMS functional entity by using an My interface between the local MBMS functional entity and the BMSC in the core network.

Optionally, the processor 1301 is further configured to determine to delete the local MBMS bearer information, and send, to the local MBMS functional entity, deletion request message for deleting the local MBMS bearer information.

Optionally, the local MBMS functional entity includes the local MBMS GW_U and the local BMSC_U, the MBMS functional entity in the core network includes the BMSC in the core network and the MBMS GW in the core network, and the deletion request message includes a first deletion request message and a second deletion request message, and the processor 1301 includes the processor in the BMSC in the core network and the processor in the MBMS GW in the core network, where the processor in the BMSC in the core network sends the first deletion request message to the local BMSC_U by using the Mz interface between the local BMSC_U and the BMSC in the core network, and the processor in the MBMS GW in the core network sends the second deletion request message to the local MBMS GW_U by using the Mx2 interface between the local MBMS GW_U and the MBMS GW in the core network.

A bus architecture may include any quantity of interconnect buses and bridges, specifically for interconnecting various circuits of one or more processors represented by the processor and a memory represented by the memory. The bus architecture may further interconnect various other circuits such as a peripheral device, a voltage regulator, and a power management circuit. These are all well known in the art, and therefore are not further described in the specification. A bus interface provides an interface. The processor is responsible for managing the bus architecture and general processing.

As can be learned from the foregoing content, in this embodiment of the present application, the local MBMS functional entity obtains the local MBMS bearer information by using the interface between the local MBMS functional entity and the MBMS functional entity in the core network, and after receiving the application layer data sent by the local application server, the local MBMS functional entity determines the local MBMS bearer information matching the application layer data, and sends the application layer data based on the local MBMS bearer information matching the application layer data. In this embodiment of the present application, the local MBMS functional entity first obtains the local MBMS bearer information, and sends the application layer data based on the local MBMS bearer information matching the application layer data. In comparison with the prior art, in this embodiment of the present application, there is no need to transmit the application layer data to a core network, thereby reducing a delay in transmission of the local application layer data, reducing bandwidth of the core network used by the local application layer data, and increasing a service capacity of a whole network.

Persons skilled in the art should understand that the embodiments of the present application may be provided as a method, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A local multimedia broadcast/multicast service (MBMS) functional entity, comprising:
a processor; and
a non-transitory computer-readable storage medium storing a program to be executed by the processor, the program including instructions to:
obtain local MBMS bearer information;
receive application layer data from a local application server;
determine, according to the obtained local MBMS bearer information and further according to a destination internet protocol (IP) address of the application layer data, local MBMS bearer information matching the application layer data; and
send the application layer data based on the matched local MBMS bearer information.

2. The local MBMS functional entity according to claim 1, wherein the program further includes instructions to:
obtain the destination IP address of the application layer data; and
use the local MBMS bearer information comprising the destination IP address of the application layer data as the matched local MBMS bearer information in response to the local MBMS bearer information having the destination IP address of the application layer data.

3. The local MBMS functional entity according to claim 1, wherein the, wherein the program further includes instructions to receive, by using an Mx1 interface between the local MBMS functional entity and a multimedia broadcast/multicast service gateway (MBMS GW) in a core network, the local MBMS bearer information sent by the MBMS GW in the core network.

4. The local MBMS functional entity according to claim 1, wherein the local MBMS functional entity comprises a local broadcast/multicast service center user plane (BMSC_U) and a local multimedia broadcast/multicast service gateway user plane (MBMS GW_U);
wherein the local MBMS bearer information comprises first MBMS bearer information and second MBMS bearer information;
wherein the processor comprises a first processor in the local BMSC_U and a second processor in the local MBMS GW_U;
wherein the program further includes instructions to cause the first processor in the local BMSC_U is configured to receive the first MBMS bearer information by using an Mz interface between the local BMSC_U and a broadcast/multicast service center (BMSC) in a core network; and
wherein the program further includes instructions to cause the second processor in the local MBMS GW_U to receive the first MBMS bearer information and the second MBMS bearer information by using an Mx2 interface between the local MBMS GW_U and an MBMS GW in the core network.

5. The local MBMS functional entity according to claim 1, wherein the local MBMS bearer information comprises third MBMS bearer information and fourth MBMS bearer information;
wherein the program further includes instructions to:
receive a bearer setup request message from the local application server; send a bearer identity request message to an BMSC in a core network;
receive, by using an My interface between the local MBMS functional entity and the BMSC in the core network, the third MBMS bearer information from the BMSC in the core network; and
determine the fourth MBMS bearer information according to the bearer setup request message.

6. The local MBMS functional entity according to claim 5, wherein the local MBMS bearer information comprises a destination IP address corresponding to a local MBMS bearer; and wherein the program further includes instructions to send the destination IP address corresponding to the local MBMS bearer to the local application server by using a bearer setup response message.

7. A multimedia broadcast/multicast service (MBMS) functional entity in a core network, wherein the MBMS functional entity in the core network comprises:
a processor; and
a non-transitory computer-readable storage medium storing a program to be executed by the processor, the program including instructions to:
receive a bearer request message;
determine local MBMS bearer information according to the bearer request message; and
send the determined local MBMS bearer information to a local MBMS functional entity, wherein the local MBMS bearer information includes at least identity information of a local MBMS bearer, and the identity information comprises a destination internet protocol (IP) address of the local MBMS bearer.

8. The MBMS functional entity in the core network according to claim 7, wherein the bearer request message is a bearer setup request message sent by a local application server; and
wherein the program further includes instructions to send a bearer setup response message to the local application server.

9. The MBMS functional entity in the core network according to claim 8, wherein the bearer setup request message comprises at least one of identity information of the local application server or to-be-broadcast area information; and
wherein the program further includes instructions to perform at least one of:
determine identity information of the local MBMS functional entity according to at least one of the identity information of the local application server or the to-be-broadcast area information, and send the identity information of the local MBMS functional entity to the local application server by using the bearer setup response message; or
determine, in response to the local MBMS functional entity having a local multimedia broadcast/multicast service gateway user plane (MBMS GW_U) and a local broadcast/multicast service center user plane (BMSC_U), identity information of the local BMSC_U and identity information of the local MBMS GW_U according to the identity information of the at least one local application server or the to-be-broadcast area information, and send the identity information of the local BMSC_U to the local application server by using the bearer setup response message.

10. The MBMS functional entity in the core network according to claim 9, wherein the MBMS functional entity in the core network comprises a broadcast/multicast service center (BMSC) in the core network and a multimedia broadcast/multicast service gateway (MBMS GW) in the core network;
wherein the processor comprises at least one of a first processor in the BMSC in the core network or a second processor in the MBMS GW in the core network;
wherein the program further includes instructions to perform at least one of:
cause the first processor in the BMSC in the core network to determine the identity information of the local BMSC_U and the identity information of the local MBMS GW_U according to the identity information of the at least one of the local application server or the to-be-broadcast area information; or
cause the first processor in the BMSC in the core network to determine the identity information of the local BMSC_U according to the at least one of the identity information of the local application server or the to-be-broadcast area information, and the processor in the MBMS GW in the core network is configured to determine the identity information of the local MBMS GW_U according to the identity information of the at least one of the local application server or the to-be-broadcast area information; or
cause the second processor in the MBMS GW in the core network to determine the identity information of the local BMSC_U and the identity information of the local MBMS GW_U according to the at least one of the identity information of the local application server or the to-be-broadcast area information.

11. The MBMS functional entity in the core network according to claim 10, wherein the MBMS functional entity in the core network comprises the BMSC in the core network and the MBMS GW in the core network, wherein the local MBMS bearer information comprises first MBMS bearer information and second MBMS bearer information; and wherein the processor comprises the processor in the BMSC in the core network and the processor in the MBMS GW in the core network;
wherein the processor in the BMSC in the core network is configured to determine the first MBMS bearer information according to the bearer setup request message sent by the local application server, and send a session start request message to the MBMS GW in the core network, wherein the session start request message comprises the first MBMS bearer information; and
wherein the processor in the MBMS GW in the core network is configured to determine the second MBMS bearer information according to the session start request message.

12. The MBMS functional entity in the core network according to claim 11, wherein the local MBMS functional entity comprises a local MBMS GW_U and a local BMSC_U, and the session start request message further comprises the identity information of the local MBMS GW_U determined by the BMSC in the core network or the identity information of the local MBMS functional entity.

13. The MBMS functional entity in the core network according to claim 11, wherein the processor in the MBMS GW in the core network is further configured to send the determined first MBMS bearer information and second MBMS bearer information to the local MBMS functional entity by using an Mx1 interface between the BMSC in the core network and the local MBMS functional entity.

14. The MBMS functional entity in the core network according to claim 11, wherein the local MBMS functional entity comprises a local MBMS GW_U and a local BMSC_U;
wherein the program further includes instructions to cause the first processor in the BMSC in the core network to send the first MBMS bearer information to the local BMSC_U by using an Mz interface between the local BMSC_U and the BMSC in the core network; and
wherein the program further includes instructions to cause the second processor in the MBMS GW in the core network to send the first MBMS bearer information and the second MBMS bearer information to the local MBMS GW_U by using an Mx2 interface between the local MBMS GW_U and the MBMS GW in the core network.

15. The MBMS functional entity in the core network according to claim 7,
wherein the bearer request message is a bearer identity request message sent by the local MBMS functional entity; and
wherein the program further includes instructions to determine the identity information of the local MBMS bearer according to the bearer identity request message sent by the local MBMS functional entity; and send the identity information of the local MBMS bearer to the local MBMS functional entity.

16. The MBMS functional entity in the core network according to claim 15, wherein the bearer identity request message comprises to-be-broadcast area information; and
wherein the program further includes instructions to determine the identity information of the local MBMS bearer according to the to-be-broadcast area information.

17. The MBMS functional entity in the core network according to claim 15, wherein the MBMS functional entity in the core network comprises a BMSC in the core network;
wherein the processor comprises a first processor in the BMSC in the core network; and wherein the program further includes instructions to cause the first processor in the BMSC in the core network to send the identity information of the local MBMS bearer to the local MBMS functional entity by using an My interface between the local MBMS functional entity and the BMSC in the core network.

18. The MBMS functional entity in the core network according to claim 7, wherein the program further includes instructions to:
determine to delete the local MBMS bearer information; and
send, to the local MBMS functional entity, a deletion request message for deleting the local MBMS bearer information.

19. A system comprising:
a local multimedia broadcast/multicast service (MBMS) functional entity, wherein the local MBMS functional entity comprises a first processor and a first non-transitory computer-readable storage medium storing a first program to be executed by the first processor, the first program including first instructions to:
obtain local MBMS bearer information from a MBMS functional entity in a core network;
receive application layer data from a local application server;
determine, according to the obtained local MBMS bearer information and further according to a destination internet protocol (IP) address of the application layer data, local MBMS bearer information matching the application layer data; and
send the application layer data based on the matched local MBMS bearer information; and
the MBMS functional entity in the core network, wherein the MBMS functional entity in the core network comprises a second processor and a second non-transitory computer-readable storage medium storing a second program to be executed by the second processor, the second program including second instructions to:
receive a bearer request message;
determine local MBMS bearer information according to the bearer request message; and
send the determined local MBMS bearer information to the local MBMS functional entity.

20. The local MBMS functional entity according to claim 19, wherein the first program further includes third instructions to:
obtain the destination IP address of the application layer data; and
use the local MBMS bearer information comprising the destination IP address of the application layer data as the matched local MBMS bearer information in response to the local MBMS bearer information having the destination IP address of the application layer data.

* * * * *